(12) United States Patent
Lee et al.

(10) Patent No.: US 12,314,133 B2
(45) Date of Patent: May 27, 2025

(54) METHOD OF DATA RECOVERY AND STORAGE SYSTEM PERFORMING THE SAME

(71) Applicant: SAMSUNG ELECTRONICS CO., LTD., Suwon-si (KR)

(72) Inventors: Seunghan Lee, Suwon-si (KR); Heon Jekal, Suwon-si (KR); Hyunjoon Yoo, Suwon-si (KR); Heeseok Eun, Suwon-si (KR); Jinwook Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 18/204,132

(22) Filed: May 31, 2023

(65) Prior Publication Data
US 2024/0126647 A1    Apr. 18, 2024

(30) Foreign Application Priority Data
Oct. 14, 2022   (KR) .......................... 10-2022-0131964

(51) Int. Cl.
*G06F 11/00*  (2006.01)
*G06F 11/10*  (2006.01)
*G06F 11/14*  (2006.01)

(52) U.S. Cl.
CPC ...... *G06F 11/1076* (2013.01); *G06F 11/1435* (2013.01)

(58) Field of Classification Search
CPC ............. G06F 11/1076; G06F 11/1435; G06F 11/0727; G06F 11/1012; G06F 11/1048
See application file for complete search history.

(56) References Cited

U.S. PATENT DOCUMENTS

| | | | |
|---|---|---|---|
| 10,014,881 B2 | 7/2018 | Blaum et al. | |
| 10,838,885 B2 | 11/2020 | Olarig et al. | |
| 11,115,056 B2 | 9/2021 | Eda et al. | |
| 11,119,855 B2 | 9/2021 | Toannou et al. | |
| 11,288,139 B2 | 3/2022 | Danilov et al. | |
| 2017/0077961 A1* | 3/2017 | Blaum | G06F 11/1048 |
| 2019/0042365 A1 | 2/2019 | Malone et al. | |
| 2019/0114096 A1* | 4/2019 | Trika | G06F 3/0619 |
| 2019/0332473 A1* | 10/2019 | Yang | G06F 11/1076 |
| 2019/0384671 A1* | 12/2019 | Chen | G06F 11/1068 |
| 2021/0382858 A1 | 12/2021 | Wang et al. | |
| 2022/0350495 A1* | 11/2022 | Lee | G06F 11/2064 |

\* cited by examiner

*Primary Examiner* — Joseph D Manoskey
(74) *Attorney, Agent, or Firm* — Sughrue Mion, PLLC

(57) ABSTRACT

A storage system includes: an interconnector; a plurality of storage devices connected to the interconnector and configured to store data; a host device connected to the interconnector, and configured to: set a plurality of erasure coding schemes that are different from each other, and determine a target erasure coding scheme corresponding to original data to be stored in the plurality of storage devices among the plurality of erasure coding schemes, based on device characteristics of the plurality of storage devices or data characteristics of the original data; and an erasure coding controller configured to: divide the original data into a plurality of data blocks corresponding to the target erasure coding scheme, and generate one or more parity blocks corresponding to the target erasure coding scheme, by encoding the plurality of data blocks.

20 Claims, 21 Drawing Sheets

| SCHEMES | NDB | NPB | SZ |
|---------|-----|-----|-----|
| SCH1 | n1 | k1 | s1 |
| SCH2 | n2 | k2 | s2 |
| SCH3 | n3 | k3 | s3 |
| ⋮ | ⋮ | ⋮ | ⋮ |

| STORAGE DEVICES | DEVICE FEATURE | ERASURE CODING SCHEMES |
|---|---|---|
| SSDEV1 | CC<c1 | SCH1 |
| SSDEV2 | c1≤CC<c2 | SCH2 |
| SSDEV3 | c2≤CC | SCH3 |

CINF2

METHOD OF DATA RECOVERY AND STORAGE SYSTEM PERFORMING THE SAME

CROSS-REFERENCE TO RELATED APPLICATION

This U.S. non-provisional application claims priority under 35 USC § 119 to Korean Patent Application No. 10-2022-0131964, filed on Oct. 14, 2022, in the Korean Intellectual Property Office (KIPO), the disclosure of which is incorporated by reference herein in its entirety.

BACKGROUND

1. Field

One or more embodiments relate generally to semiconductor integrated circuits, and more particularly to a method of data recovery and a storage system performing the method.

2. Description of Related Art

A redundant data storage system may distribute data across multiple storage devices, which may be referred to as a redundant array of independent disks (RAID). Various RAID configurations may be referred to as RAID levels.

For example, RAID 0 recovers data loss by creating a mirror copy of the storage device. However, such a mirror copy limits the efficient use of memory resources of the storage device.

For another example, RAID 5 strips data into N data segments, creates one parity segment, and stores each of the N+1 segments respectively in N+1 storage devices. RAID 5 only provides data recovery for a single failure.

Since these RAID levels assume that the performance of all storage devices to which RAID is applied is the same, if there is a difference in performance between storage devices, the performance of an entire storage system is leveled down to the lowest performance.

SUMMARY

Provided are a storage system and a method of data recovery of a storage system, capable of efficiently restore data loss.

According to an aspect of the disclosure, a method of data recovery of a storage system having a plurality of storage devices and a host device controlling the plurality of storage devices, the method includes: setting a plurality of erasure coding schemes that are different from each other; determining a target erasure coding scheme among the plurality of erasure coding schemes, based on device characteristics of the plurality of storage devices or data characteristics of original data to be stored in the plurality of storage devices, the target erasure coding scheme being corresponding to the original data; dividing the original data into a plurality of data blocks corresponding to the target erasure coding scheme; generating one or more parity blocks by encoding the plurality of data blocks, the one or more parity blocks being corresponding to the target erasure coding scheme; storing a data stripe includes the plurality of data blocks and the parity blocks in the plurality of storage devices; and based on a loss that occurs in the plurality of data blocks stored in the plurality of storage devices, restoring the original data based on the parity blocks stored in the plurality of storage devices.

According to another aspect of the disclosure, a storage system includes: an interconnector; a plurality of storage devices connected to the interconnector and configured to store data; a host device connected to the interconnector, and configured to: set a plurality of erasure coding schemes that are different from each other, and determine a target erasure coding scheme corresponding to original data to be stored in the plurality of storage devices among the plurality of erasure coding schemes, based on device characteristics of the plurality of storage devices or data characteristics of the original data; and an erasure coding controller configured to: divide the original data into a plurality of data blocks corresponding to the target erasure coding scheme, and generate one or more parity blocks corresponding to the target erasure coding scheme, by encoding the plurality of data blocks.

According to another aspect of the disclosure, a method of data recovery of a storage system having a plurality of storage devices and a host device controlling the plurality of storage devices, the method includes: generating coding information comprising a plurality of erasure coding schemes respectively corresponding to a plurality of storage devices; determining a target storage device configured to store original data among the plurality of storage devices; determining, based on the coding information, a target erasure coding scheme among the plurality of erasure coding schemes, the target erasure coding scheme being corresponding to the target storage device; dividing the original data into a plurality of data blocks corresponding to the target erasure coding scheme; generating one or more parity blocks by encoding the plurality of data blocks, the one or more parity blocks being corresponding to the target erasure coding scheme; storing a data stripe comprising the plurality of data blocks and the parity blocks in the target storage device; and restoring the original data, based on a loss that occurs in the plurality of data blocks stored in the target storage device, and based on the parity blocks stored in the target storage device.

The storage system and the method of data recovery of the storage system according to one or more embodiments may efficiently restore data loss and enhance reliability of the storage system regardless of performance difference between the plurality of storage devices by determining the target erasure coding scheme corresponding to the original data based on the device characteristics of the plurality of storage devices or the data characteristics of the original data.

BRIEF DESCRIPTION OF DRAWINGS

One or more embodiments of the present disclosure will be more clearly understood from the following detailed description taken in conjunction with the accompanying drawings.

DETAILED DESCRIPTION OF EMBODIMENTS

Figure 1:
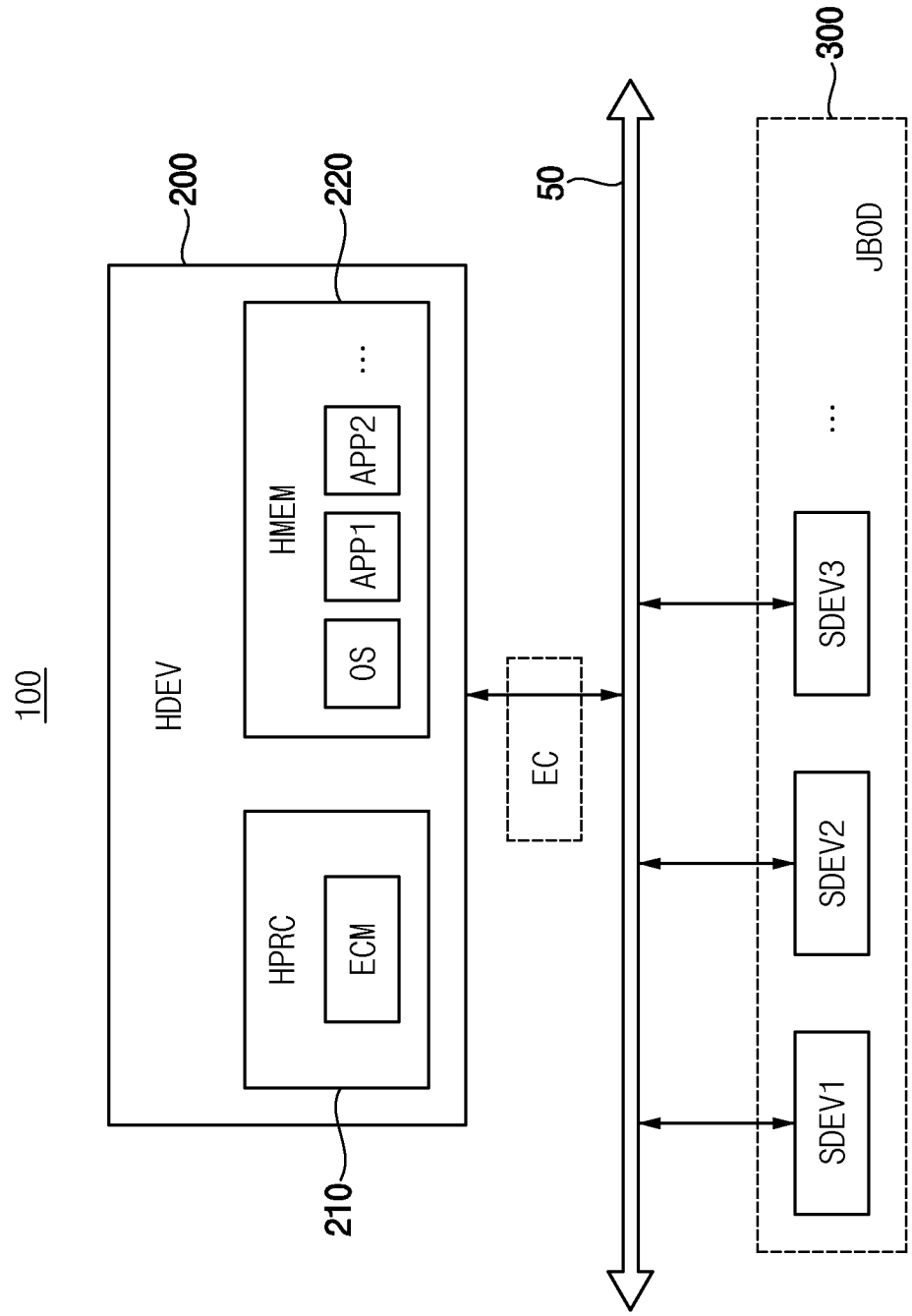
FIG. 1 is a block diagram illustrating a storage system according to one or more embodiments.

One or more embodiments will be described more fully hereinafter with reference to the accompanying drawings, in which one or more embodiments are shown. The embodiments described herein are example embodiments, and thus, the disclosure is not limited thereto and may be realized in various other forms. In the drawings, like numerals refer to like elements throughout. The repeated descriptions may be omitted.

Figure 2:
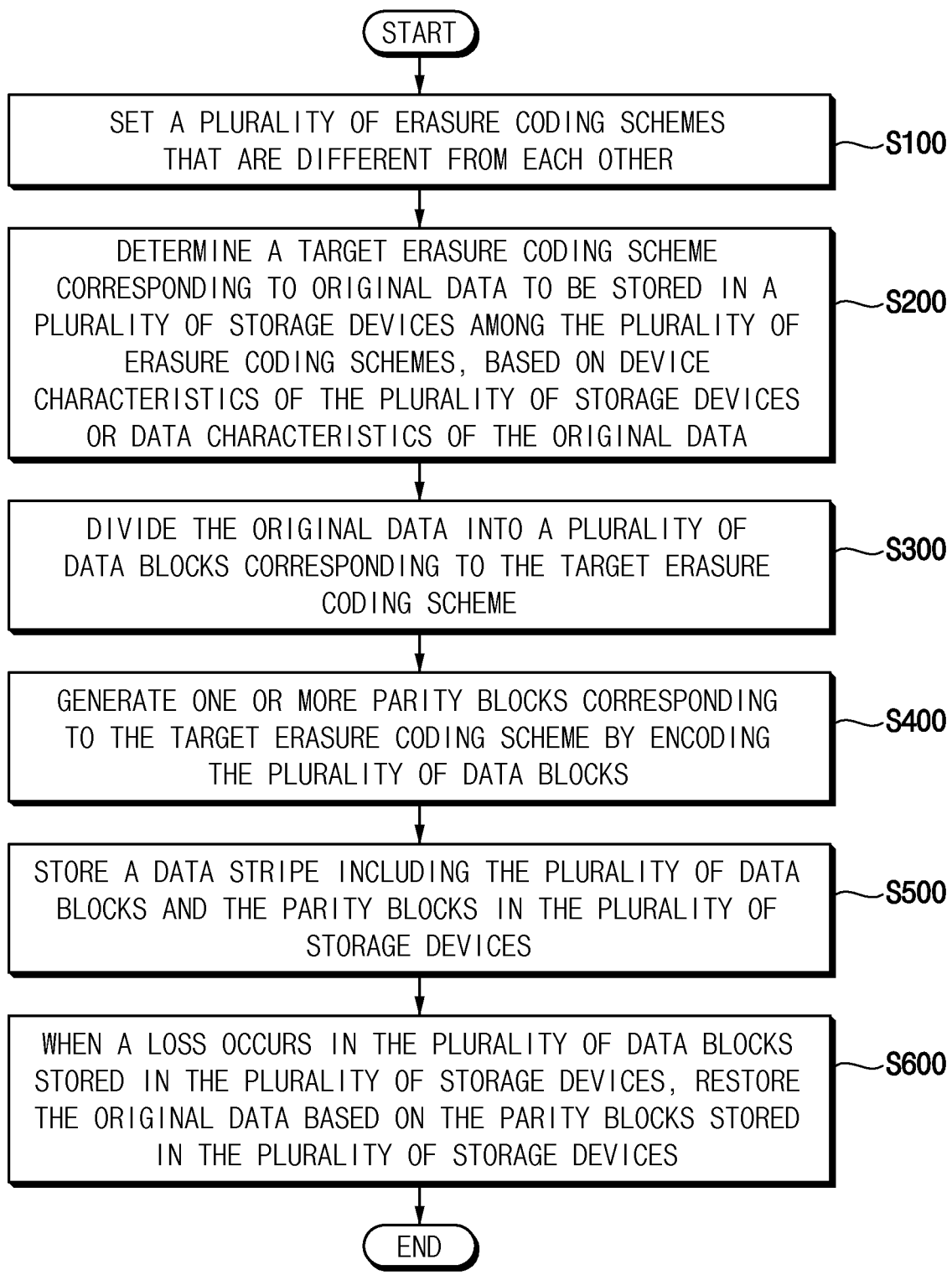
FIG. 2 is a flowchart illustrating a method of data recovery of a storage system according to one or more embodiments.

FIG. 1 is a block diagram illustrating a storage system according to one or more embodiments, and FIG. 2 is a flowchart illustrating a method of data recovery of a storage system according to one or more embodiments.

Referring to FIG. 1, a storage system 100 includes an interconnector 50, a host device HDEV 200, a plurality of storage devices SDEV1, SEV2 and SDEV3 300, and at least one erasure coding controller EC.

In one or more embodiments, the plurality of storage devices 300 may include a universal flash storage (UFS), a solid state drive (SSD), a multi-media card (MMC), an embedded multi-media card (eMMC), a secure digital (SD) card, a micro SD card, a memory stick, a chip card, a universal serial bus (USB) card, a smart card, a compact flash (CF) card, or the like.

In one or more embodiments, the storage system 100 may include a various computing system, a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The host device 200 and the storage devices 300 may be connected to an interconnector 50 and exchange signals and/or data through the interconnector 50. The interconnector 50 may be referred to as a network fabric. The interconnector 50 may be implemented with any suitable networking protocol and/or medium, such as Ethernet, Fiber Channel, InfiniBand, etc., as well as either directly or through intermediary devices such as switches, hubs, etc., which may be a part of interconnector 50. The interconnector 50 may be implemented with any other communication or interconnect protocol that may enable communication between the host device 200 and the storage devices 301, 302 and 303, such as PCIe (peripheral component interconnect express), SATA (Serial ATA), SAS (Serial Attached SCSI), OcuLink, etc.

The host device 200 controls overall operations of the storage system 100. The host device 200 may include a host processor 210 and a host memory 220.

The host processor 210 may control an operation of the host device 200. For example, the host processor 210 may execute an operating system (OS). In addition, the host processor 210 may execute various applications APP1 and APP2 running on the OS. The host processor 210 may be a homogeneous multi-core processor or a heterogeneous multi-core processor that includes at least two processor cores independently executing program instructions.

The host memory 220 may store instructions and/or data that are executed and/or processed by the host processor 210. For example, the OA or applications APP1 and APP2 may be loaded into the host memory 220 during booting. For example, when the storage system 100 boots, the OS stored in one of the storage devices 301, 302 and 303 may be loaded into the host memory 220, and then applications APP1 and APP2 may be loaded by the OS into the host memory 220.

In one or more embodiments, an erasure coding manager ECM may be implemented as software, for example, as a portion of the OS or an application executed by the hose processor 210. In one or more embodiments, the erasure coding manager ECM may be implemented as hardware logic distinct from the host processor 210.

The erasure coding controller EC may perform erasure coding, that is, erasure code encoding and erasure code decoding. The erasure coding will be described below with reference to FIG. 3.

In one or more embodiments, as will be described below with reference to FIG. 6, the erasure coding controller EC may include a plurality of local erasure coding controllers respectively included in the plurality of storage devices 300 such that each local erasure coding controller performs erasure coding with respect to each storage device.

In one or more embodiments, as will be described below with reference to FIG. 11, the erasure coding controller EC may include a global erasure coding controller included in the interconnector 50 such that the global erasure coding controller performs erasure coding with respect to the plurality of storage devices 300.

In operation S100 of FIG. 2, the erasure coding manager ECM may set a plurality of erasure coding schemes that are different from each other. The plurality of erasure coding schemes will be described below with reference to FIG. 4.

In operation S200, the erasure coding manager ECM may determine a target erasure coding scheme corresponding to original data to be stored in the plurality of storage devices 300 among the plurality of erasure coding schemes, based on device characteristics of the plurality of storage devices 300 or data characteristics of the original data. In other words, in operation S200, the erasure coding manager ECM may determine a target erasure coding scheme among the plurality of erasure coding schemes, based on device characteristics of the plurality of storage devices or data characteristics of original data to be stored in the plurality of storage devices. The target erasure coding scheme may correspond to the original data.

In one or more embodiments, as will be described below with reference to FIGS. 12 through 15, the erasure coding manager ECM may determine the target erasure coding scheme corresponding to the original data based on the device characteristics of the plurality of storage devices 300. In one or more embodiments, as will be described below with reference to FIG. 21, the erasure coding manager ECM may determine the target erasure coding scheme based on the data characteristics of the original data.

In operation S300, the erasure coding controller EC may perform the erasure code encoding of the original data based on the target erasure coding scheme. In other words, the erasure coding controller EC may divide the original data into a plurality of data blocks corresponding to the target erasure coding scheme.

In operation S400, the erasure coding controller EC may generate one or more parity blocks corresponding to the target erasure coding scheme by encoding the plurality of data blocks. In other words, in operation S400, the erasure coding controller EC may generate one or more parity blocks by encoding the plurality of data blocks. The one or more parity blocks may correspond to the target erasure coding scheme.

In operation S500, the plurality of storage devices 300 may store a data stripe including the plurality of data blocks and the parity blocks in the plurality of storage devices 300. In one embodiment, the data stripe may include other elements in addition to the plurality of data blocks and the parity blocks in the plurality of storage devices 300.

According to one or more embodiments, all of the plurality of data blocks and the parity blocks included in the same data stripe may be stored in the same storage device of the plurality of storage devices 300. In other words, the plurality of data blocks and the parity blocks in the data stripe are stored in a same storage device of the plurality of storage devices.

In one or more embodiments, as will be described below with reference to FIG. 18, each storage device of the plurality of storage devices 300 may store only the data stripes corresponding to the same erasure coding scheme. In one or more embodiments, as will be described below with reference to FIG. 23, each storage device of the plurality of storage devices 300 may store the data stripes corresponding to the different erasure coding schemes.

In one or more embodiments, the plurality of storage devices 300 may be connected to the host device as a just bunch of disks (JBOD). The JBOD may be a concatenation or spanning of disk drives, and thus, the JBOD may be distinguished from multiple RAID levels. The JBOD may combine multiple physical disk drives, or storage devices, into one logical disk.

Since the RAID levels may assume that the performance of all storage devices to which RAID is applied is the same, if there is a difference in performance between storage devices, the performance is leveled down to the lowest performance. In contrast, in the case of JBOD, member disks may have different performances.

In operation S600, when data loss occurs in the plurality of data blocks stored in the plurality of storage devices 300, the erasure coding controller EC may perform erasure code decoding. In other words, the erasure coding controller EC may restore the original data based on the parity blocks stored in the plurality of storage devices 300, when a loss occurs in the plurality of data blocks stored in the target storage device. In other words, based on a loss occurring in the plurality of data blocks stored in the plurality of storage devices, the erasure coding controller EC restores the original data based on the parity blocks stored in the plurality of storage devices. In one embodiment, the erasure coding controller EC restores the original data, based on a loss occurring in the plurality of data blocks stored in the plurality of storage devices, and based on the parity blocks stored in the plurality of storage devices.

As such, the storage system 100 and the method of data recovery of the storage system 100 according to one or more embodiments may efficiently restore data loss and enhance reliability of the storage system 100 regardless of performance difference between the plurality of storage devices 300 by determining the target erasure coding scheme corresponding to the original data based on the device characteristics of the plurality of storage devices 300 or the data characteristics of the original data.

Figure 3:
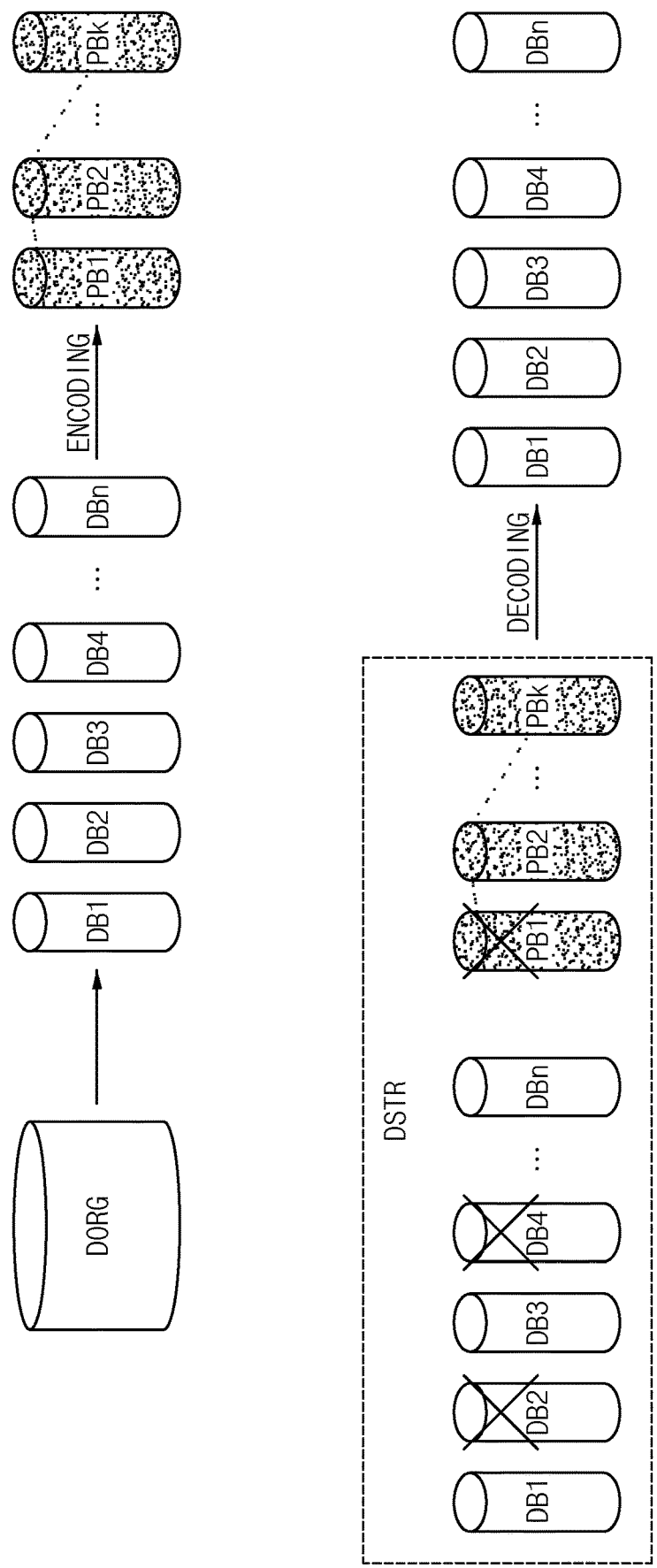
FIG. 3 is a diagram illustrating erasure coding applied to a method of data recovery of a storage system according to one or more embodiments.

FIG. 3 is a diagram illustrating erasure coding applied to a method of data recovery of a storage system according to one or more embodiments. The erasure coding is a data duplication method designed to increase the efficiency of data storage space in a storage device. It encodes data using an erasure code and recovers the original data through a decoding process when the data is lost.

As shown in FIG. 3, the erasure coding controller EC divides the original data DORG into n data blocks (where n is a natural number equal to or greater than 2) DB1 to DBn and then encodes the original data DORG using an erasure code to generate k (k is a natural number greater than or equal to 1) parity blocks. A coding algorithm such as Reed-Solomon may be used to calculate one or more parity blocks based on the n data blocks.

Such n data blocks DB1 to DBn and k parity blocks PB1 to PBk may be referred to as a data stripe DSTR. The data stripe DSTR is stored in a storage device. If data loss occurs in k blocks or less among the (n+k) blocks stored in this way, the erasure coding controller EC may restore the original data DORG by decoding the blocks in which data loss does not occur among the n+k blocks. Through such erasure code encoding and erasure code decoding, the original data DORG may be restored even if up to k blocks are lost, if only n blocks are valid among the (n+k) blocks.

The performance of erasure coding or the data recovery performance may be represented by a coding performance parameter. When the number n of the data blocks is fixed, the coding performance parameter may be represented by the number k of the parity blocks. According to one or more embodiments, the number n of the data blocks may be variable, in which case the coding performance parameter may be a ratio (k/n) of the number k of the parity blocks to the number n of the data blocks, or the coding performance parameter may be a ratio (k/(n+k)) of the number k of the parity blocks to the total number (n+k) of the data and parity blocks.

Figures 4, 5:
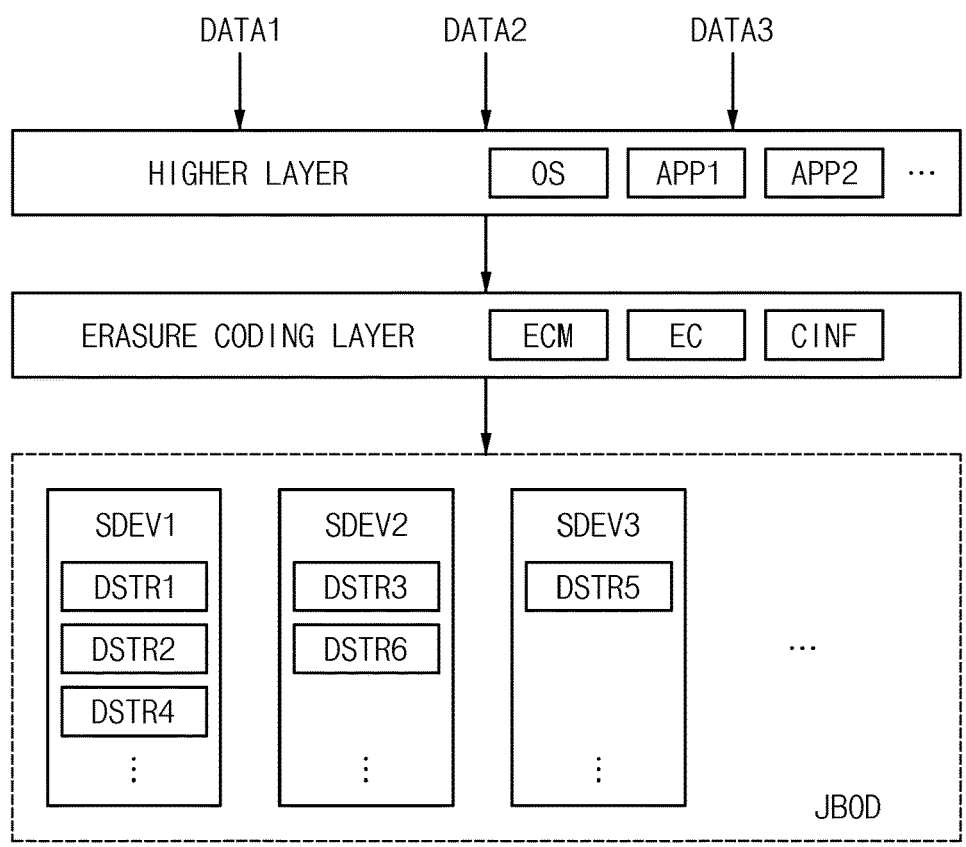
FIG. 4 is a diagram illustrating a plurality of erasure coding schemes in a method of data recovery of a storage system according to one or more embodiments.
FIG. 5 is a diagram illustrating a hierarchical structure of a storage system according to one or more embodiments.

FIG. 4 is a diagram illustrating a plurality of erasure coding schemes in a method of data recovery of a storage system according to one or more embodiments. Referring to FIG. 4, each erasure coding scheme may include the number NDB of the data blocks and the number NPB of the parity blocks. In one embodiment, an erasure coding scheme may include the number NDB of the data blocks and the number NPB of the parity blocks. According to one or more embodiments, each erasure coding scheme may further include respective sizes SZ of the data blocks and the parity blocks. The size SZ may be a page size of a nonvolatile memory device such as 4 KB or 8 KB, but is not limited thereto.

The erasure coding manager ECM of FIG. 1 may set a plurality of different erasure coding schemes SCH1, SCH2, and SCH3 according to the performance of the storage system 100, an operating environment, and/or an operating scenario.

In an example embodiment, each of the plurality of erasure coding schemes SCH1, SCH2, and SCH3 may be represented by a combination (NDB, NPB) of the number NDB of the data blocks and the number NPB of the parity blocks. The first erasure coding scheme SCH1 may correspond to a combination of (n1, k1), the second erasure coding scheme SCH2 may correspond to a combination of (n2, k2), and the third erasure coding scheme SCH3 may correspond to a combination of (n3, k3).

In an example embodiment, each of the plurality of erasure coding schemes SCH1, SCH2, and SCH3 may be represented by a combination (NDB, NPB, SZ) of the number NDB of the data blocks, the number NPB of the parity blocks (NPB), and the size SZ. The first erasure coding scheme SCH1 may correspond to a combination of (n1, k1, s1), the second erasure coding scheme SCH2 may correspond to a combination of (n2, k2, s2), and the third erasure coding scheme SCH3 may corresponds to a combination of (n3, k3, s3).

Two erasure coding schemes being different from each other may indicate that at least one of the number NDB of the data blocks and the number NPB of the parity blocks is different.

In this disclosure, the subscript i of SCHi may indicate the performance of erasure coding. In other words, the second erasure coding scheme SCH2 may have higher coding performance or data recovery performance than the first erasure coding scheme SCH1, and the third erasure coding scheme SCH3 may have higher coding performance or data recovery performance than the second erasure coding scheme SCH2. For example, the fact that the second erasure coding scheme SCH2 has a higher coding performance than the first erasure coding scheme SCH1 may indicate that k2 is greater than k1, or k2/n2 is greater than k1/n1, or k2/(n2+k2) is greater than k1/(n1+n1).

Among the plurality of erasure coding schemes SCH1, SCH2, and SCH3 as described above, the target erasure coding scheme corresponding to the original data stored in the storage devices 300 may be determined.

FIG. 5 is a diagram illustrating a hierarchical structure of a storage system according to one or more embodiments. Referring to FIG. 5, three different files or other units of data are represented by first data DATA1, second data DATA2 and third data DATA3. Such data may be provided to or generated by higher layers such as users, applications, and file systems.

The erasure coding layer, which includes the erasure coding manager ECM, the erasure coding controller EC and coding information CINF, may divide data into fixed-size data blocks (or data chunks), calculate parity blocks (or parity chunks) from the data blocks using any appropriate erasure coding algorithm, and store a data stripe DSTRs including the data blocks and the corresponding parity blocks in one of a plurality of storage devices DEV1, SDEV2, SDEV3.

In general distributed erasure coding, one data stripe is distributed and stored in the plurality of storage devices SDEV1, SDEV2, and SDEV3. The problem with these distributed erasure coding techniques is that updating a data block on one storage device includes reading one or more corresponding data blocks contained in the same data stripe from another storage device, and recalculating one or more parity blocks for the data stripe, and writing one or more recalculated parity blocks back to another storage device. Such update-driven parity rewriting may result in write amplification, reducing throughput and/or lifetime of the storage device.

Another potential problem with the distributed erasure coding techniques is that, because they are typically based on logical block address, the entire failed drive may be reconstructed rather than the actual user data written in the drive. Because of this, the recovery process for the storage device may take a long time. Moreover, this may become a growing problem as the size and/or density of storage devices increase.

Another potential problem with the distributed erasure coding techniques is that they may introduce inefficiencies in the use of computational storage devices. A computational storage device may include computational resources in the storage device such that computations may be performed on the stored data. This may reduce the burden on the storage device and/or the input-output traffic. However, when the erasure coding techniques are applied to computational storage devices, the division and distribution of the user data across storage devices may be controlled by a system-level erasure coding layer that is unaware of the computational strategies of users and/or applications. Thus, the computational resources in the storage device may only operate on data partitions determined by the erasure coding algorithm, which may not be ideal or computationally efficient. In some cases, this can lead to inefficient operation and/or under-utilization of the computational storage devices.

To solve the problem of the distributed erasure coding, according to one or more embodiments, the data blocks and the parity blocks included in each of the data stripes DSTR1 to DSTR6 may all be stored in a single storage device.

As will be described below with reference to FIG. 11, the erasure coding controller EC may include a global erasure coding controller that commonly performs erasure coding for a plurality of storage devices. This global erasure coding technology may reduce the cost and occupied area of the entire storage system by minimizing the configuration of the erasure coding controller EC. On the other hand, the global erasure coding technology may cause various problems and challenges. For example, centralized encoding of write data (and decoding of read data) may cause processing bottlenecks at the system level. This may occur when there are different types and/or different data sources for different storage devices, and may occur commonly in systems with multiple storage devices. For example, in system-level centralized erasure coding techniques, data is artificially moved from multiple distributed nodes through a central node where computations for erasure coding are performed before moving back to the distributed storage device. Accordingly, in addition to processing bottlenecks, there may be data movement bottlenecks at the central processing location.

Accordingly, one or more embodiments may be more useful for the local erasure coding technique as described with reference to FIG. 6. However, one or more embodiments are not limited to the local erasure coding technique as described with reference to FIG. 6 and may be applied to the global erasure coding technique as described with reference to FIG. 11.

Figure 6:
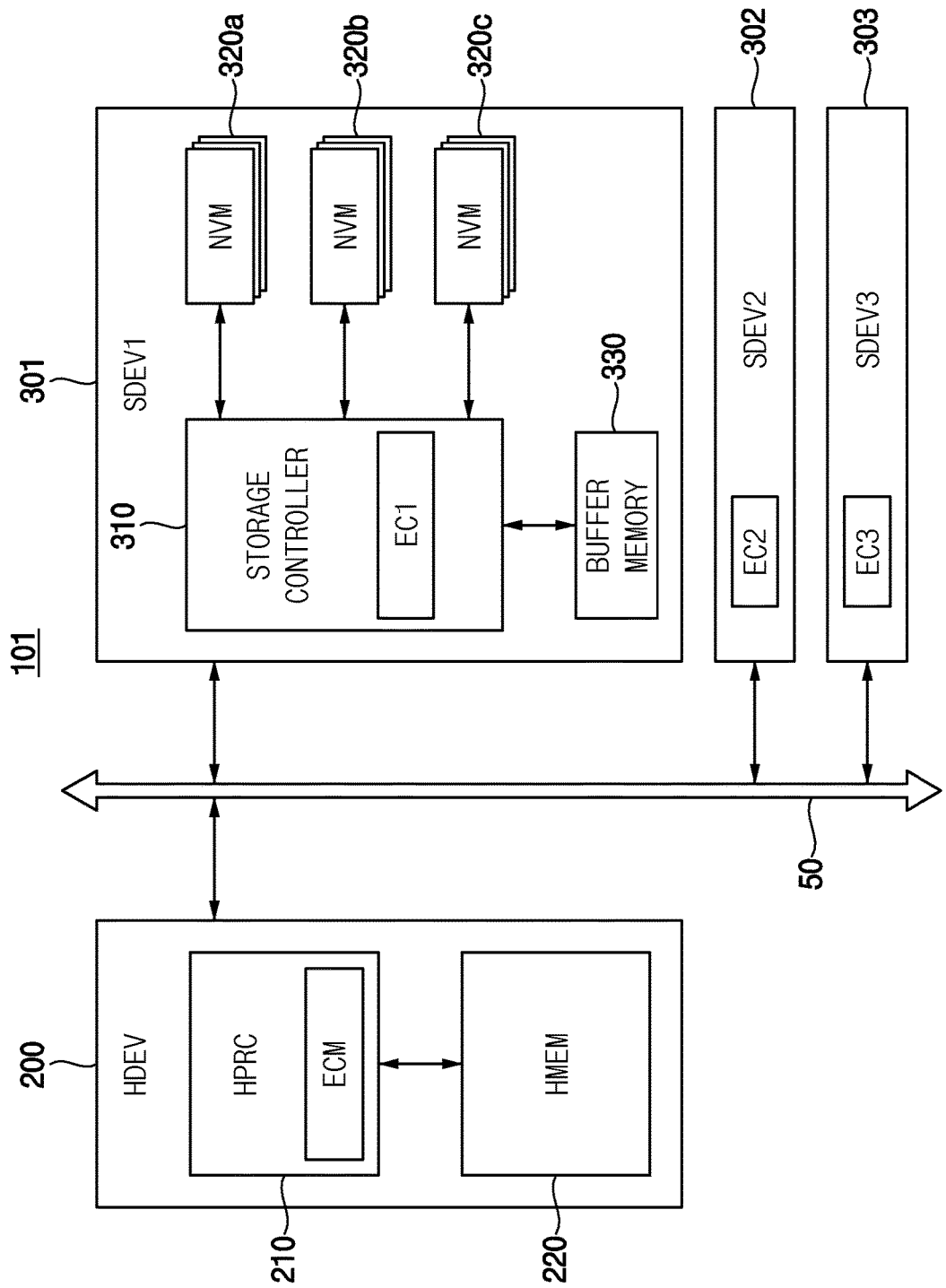
FIG. 6 is a block diagram illustrating a storage system according to one or more embodiments.

FIG. 6 is a block diagram illustrating a storage system according to one or more embodiments. Referring to FIG. 6, a storage system 101 includes a host device HDEV 200 and one or more storage devices SDEV1, SEV2 and SDEV3 301, 302 and 303. The host device 200 may include a host processor 210 and a host memory 220. Hereinafter, descriptions repeated with FIG. 1 are omitted and one or more embodiments are described based on the one storage device 301, and the other storage device 302 and 303 may have the same or similar configuration.

The storage device 301 is accessed by, that is, communicably coupled to the host device 200. The storage device 301 may include a storage controller 310, a plurality of nonvolatile memories 320a, 320b and 320c, and a buffer memory 330.

The storage controller 310 may control an operation of the storage device 301, e.g., a data write operation and/or a data read operation, based on a command and data that are received from the host device 200.

The plurality of nonvolatile memories 320a, 320b and 320c may store a plurality of data. For example, the plurality of nonvolatile memories 320a, 320b and 320c may store the metadata, various user data, or the like.

In one or more embodiments, each of the plurality of nonvolatile memories 320a, 320b and 320c may include a NAND flash memory. In other embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a static random access memory (SRAM), a DRAM, or the like.

In one or more embodiments, the storage device 301 may be a universal flash storage (UFS). In other embodiments, the storage device 301 may be a solid state drive (SSD), a multi-media card (MMC) or an embedded multi-media card (eMMC). In still other embodiments, the storage device 301 may be one of a secure digital (SD) card, a micro SD card, a memory stick, a chip card, a universal serial bus (USB) card, a smart card, a compact flash (CF) card, or the like.

In one or more embodiments, the storage device 301 may be connected to the host device 200 through the interconnector 50 which may include, for example, a UFS, an eMMC, a serial advanced technology attachment (SATA) bus, a nonvolatile memory express (NVMe) bus, a serial attached SCSI (SAS) bus, or the like.

As illustrated in FIG. 6, the storage system 101 may include a plurality of local erasure coding controllers EC1, EC2 and EC3.

The plurality of local erasure coding controllers EC1, EC2 and EC3 may be respectively included in the plurality of storage devices 301, 302 and 303 such that each local erasure coding controller performs erasure coding with respect to each storage device.

In other words, the first storage device 301 may include the first local erasure coding controller EC1 dedicatedly performing the erasure coding with respect to the first storage device 301, the second storage device 302 may include the second local erasure coding controller EC2 dedicatedly performing the erasure coding with respect to the second storage device 303, and the third storage device 303 may include the third local erasure coding controller EC3 dedicatedly performing the erasure coding with respect to the third storage device 303.

FIG. 6 illustrates that the local erasure coding controller EC1 is included in the storage controller 310. In one or more embodiments, the local erasure coding controller EC1 may be implemented as independent hardware logic distinct from the storage controller 310.

Figure 7:
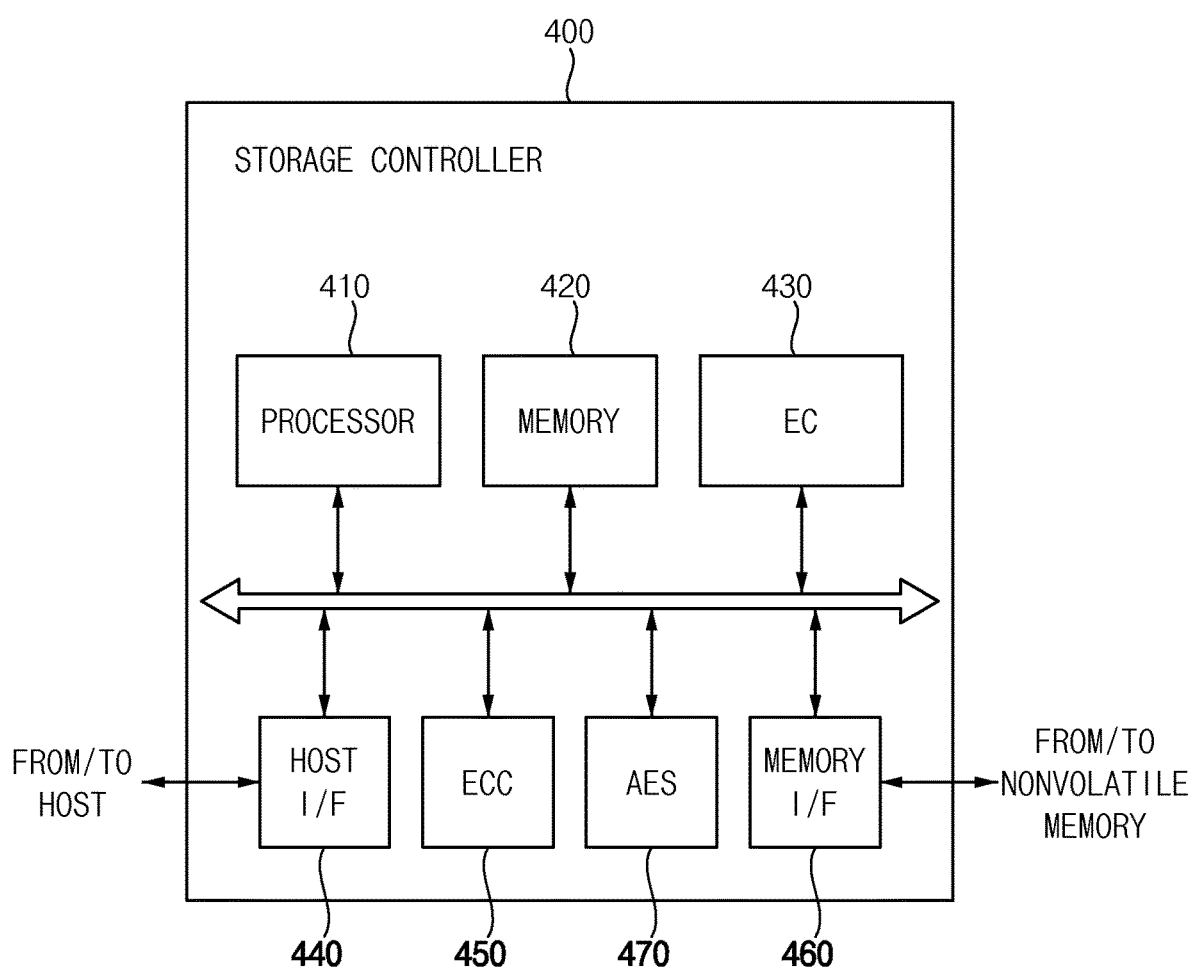
FIG. 7 is a block diagram illustrating a storage controller included in a storage system according to one or more embodiments.

FIG. 7 is a block diagram illustrating a storage controller included in a storage system according to one or more embodiments. Referring to FIG. 7, a storage controller 400 may include a processor 410, a memory 420, an erasure coding controller EC 430, a host interface 440, an error correction code (ECC) engine 450, a memory interface 460 and an advanced encryption standard (AES) engine 470.

The processor 410 may control an operation of the storage controller 400 in response to a command received via the host interface 440 from a host device (e.g., the host device 200 in FIG. 6). For example, the processor 410 may control an operation of a storage device (e.g., the first storage device 301 of FIG. 6), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The erasure coding controller 430 (e.g., the first local erasure coding controller EC1 in FIG. 6) may perform the erasure coding, that is, the erasure code encoding and the erasure code decoding as described above. The erasure coding controller 430 may perform the erasure code encoding and the erasure code decoding according to the target erasure coding scheme that is determined based on the device characteristics of the storage device (e.g., the first storage device 301 in FIG. 6) or the data characteristic of the original data.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes. As will be described below with reference to FIG. 24, the erasure coding controller 430 may perform the erasure code encoding and the erasure code decoding by units of data stripe. In contrast, the ECC engine 450 may perform the ECC encoding and the ECC decoding with respect to each of data and parity blocks.

The host interface 440 may provide physical connections between the host device and the storage device. The host interface 440 may provide an interface corresponding to a bus format of the host device for communication between the host device and the storage device. In one or more embodiments, the bus format of the host device may be a small computer system interface (SCSI) or a serial attached SCSI (SAS) interface. In other embodiments, the bus format of the host device may be a USB, a peripheral component interconnect (PCI) express (PCIe), an advanced technology attachment (ATA), a parallel ATA (PATA), an SATA, a nonvolatile memory (NVM) express (NVMe), etc., format.

The memory interface 460 may exchange data with a nonvolatile memory (e.g., the nonvolatile memories 320a, 320b and 320c in FIG. 2). The memory interface 460 may transfer data to the nonvolatile memory, or may receive data read from the nonvolatile memory. In one or more embodiments, the memory interface 460 may be connected to the nonvolatile memory via one channel. In other embodiments, the memory interface 460 may be connected to the nonvolatile memory via two or more channels. For example, the memory interface 460 may be configured to comply with a standard protocol, such as Toggle or open NAND flash interface (ONFI).

The AES engine 470 may perform at least one of an encryption operation and a decryption operation on data input to the storage controller 400 using a symmetric-key algorithm. The AES engine 470 may include an encryption module and a decryption module. For example, the encryption module and the decryption module may be implemented as separate modules. For another example, one module capable of performing both encryption and decryption operations may be implemented in the AES engine 470.

Figure 8:
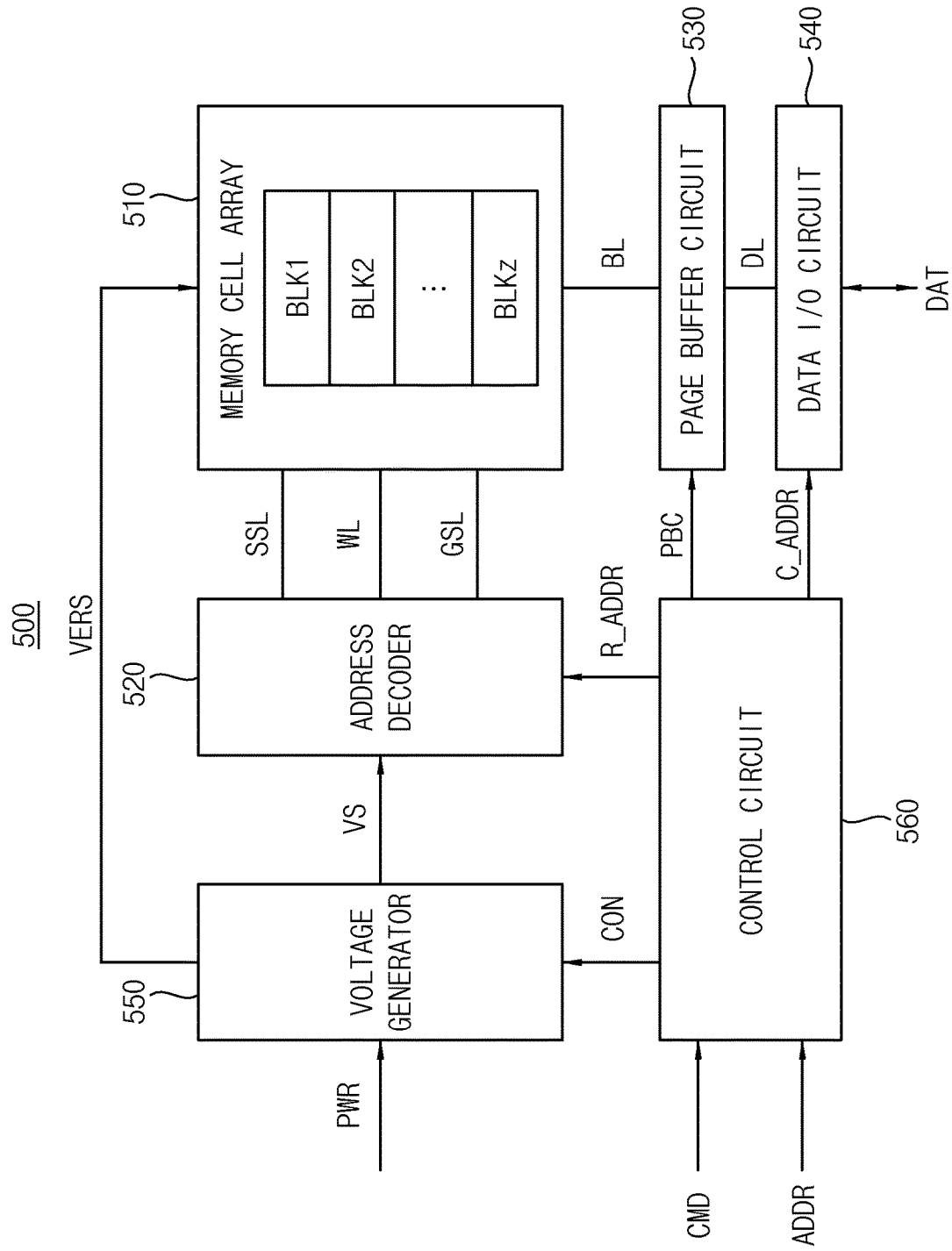
FIG. 8 is a block diagram illustrating an example embodiment of a nonvolatile memory device included in a storage system according to one or more embodiments.

FIG. 8 is a block diagram illustrating an example embodiment of a nonvolatile memory device included in a storage system according to one or more embodiments. Referring to FIG. 8, a nonvolatile memory 500 includes a memory cell array 510, an address decoder 520, a page buffer circuit 530, a data I/O circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In one or more embodiments, the plurality of memory cells included in the memory cell array 510 may be arranged in a two-dimensional (2D) array structure or a three-dimensional (3D) vertical array structure. The memory cell array of the 3D vertical array structure will be described below with reference to FIG. 10.

The control circuit 560 receives a command CMD and an address ADDR from an outside (e.g., from the storage controller 310 in FIG. 6), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the remaining wordlines, other than the selected wordline, as unselected wordlines, based on the row address R_ADDR.

In addition, in the data erase/write/read operations, the address decoder 520 may determine at least one of the plurality of string selection lines SSL as a selected string selection line, and may determine the remaining string selection lines, other than the selected string selection line, as unselected string selection lines, based on the row address R_ADDR.

Further, in the data erase/write/read operations, the address decoder 520 may determine at least one of the plurality of ground selection lines GSL as a selected ground selection line, and may determine the remaining ground selection lines, other than the selected ground selection line, as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage that is required for the data erase operation based on the power PWR and the control signals CON. The erase voltage may be applied to the memory cell array 510 directly or via the bitline BL.

For example, during the erase operation, the voltage generator 550 may apply the erase voltage to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In one or more embodiments, each page buffer may be connected to one bitline. In other embodiments, each page buffer may be connected to two or more bitlines.

The page buffer circuit 530 may store data DAT to be programmed into the memory cell array 510 or may read data DAT sensed (i.e., read) from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory is described based on a NAND flash memory, one or more embodiments are not limited thereto, and the nonvolatile memory may be any nonvolatile memory, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

Figure 9:
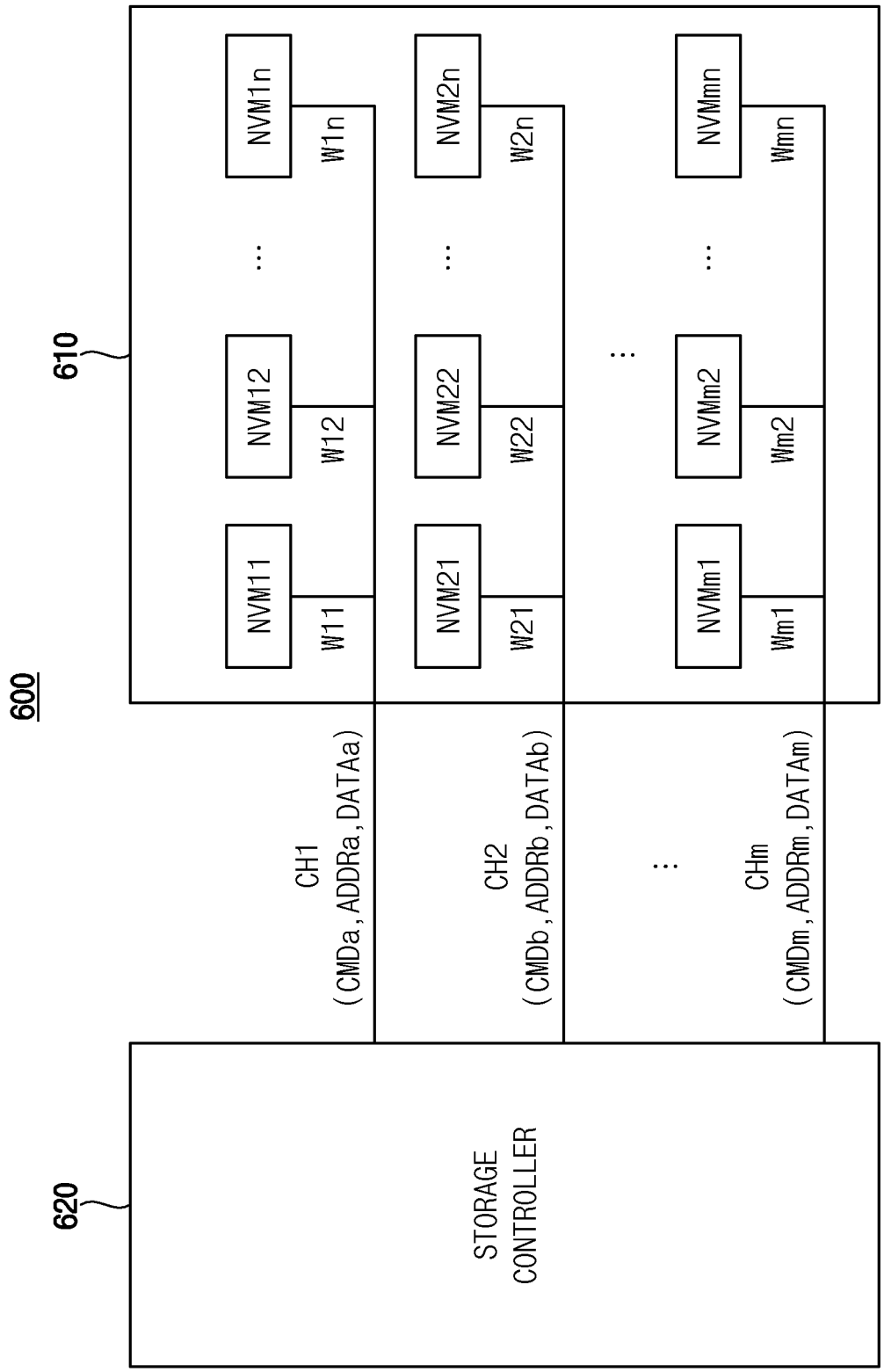
FIG. 9 is a block diagram illustrating a storage device according to one or more embodiments.

FIG. 9 is a block diagram illustrating a storage device according to one or more embodiments. Referring to FIG. 9, a memory device 600 may include a nonvolatile memory device 610 and a storage controller 620. The memory device 600 may support a plurality of channels CH1, CH2, . . . , CHm, and the nonvolatile memory device 610 may be connected to the storage controller 620 through the plurality of channels CH1 to CHm. For example, the memory device 600 may be implemented as a storage device, such as a universal flash storage (UFS), a solid state drive (SSD), or the like.

The nonvolatile memory device 610 may include a plurality of nonvolatile memories NVM11, NVM12, . . . , NVM1n, NVM21, NVM22, . . . , NVM2n, NVMm1, NVMm2, . . . , NVMmn. For example, the nonvolatile memories NVM11 to NVMmn may correspond to the nonvolatile memories 320a, 320b and 320c in FIG. 6. Each of the nonvolatile memories NVM11 to NVMmn may be connected to one of the plurality of channels CH1 to CHm through a way corresponding thereto. For instance, the nonvolatile memories NVM11 to NVM1n may be connected to the first channel CH1 through ways W11, W12, . . . , W1n, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, . . . , Wmn.

In one or more embodiments, each of the nonvolatile memories NVM11 to NVMmn may be implemented as a memory unit that may operate according to an individual command from the storage controller 620. For example, each of the nonvolatile memories NVM11 to NVMmn may be implemented as a chip or a die, but one or more embodiments are not limited thereto.

The storage controller 620 may transmit and receive signals to and from the nonvolatile memory device 610 through the plurality of channels CH1 to CHm. For example, the storage controller 620 may correspond to the storage controller 310 in FIG. 6. For example, the storage controller 620 may transmit commands CMDa, CMDb, . . . , CMDm, addresses ADDRa, ADDRb, . . . , ADDRm and data DATAa, DATAb, . . . , DATAm to the memory device 610 through the channels CH1 to CHm, or may receive the data DATAa to DATAm from the nonvolatile memory device 610 through the channels CH1 to CHm.

The storage controller 620 may select one of the nonvolatile memories NVM11 to NVMmn, which is connected to each of the channels CH1 to CHm, using a corresponding one of the channels CH1 to CHm, and may transmit and receive signals to and from the selected nonvolatile memory. For example, the storage controller 620 may select the nonvolatile memory NVM11 from among the nonvolatile memories NVM11 to NVM1n connected to the first channel CH1. The storage controller 620 may transmit the command CMDa, the address ADDRa and the data DATAa to the selected nonvolatile memory NVM11 through the first channel CH1 or may receive the data DATAa from the selected nonvolatile memory NVM11 through the first channel CH1.

The storage controller 620 may transmit and receive signals to and from the nonvolatile memory device 610 in parallel through different channels. For example, the storage controller 620 may transmit the command CMDb to the nonvolatile memory device 610 through the second channel CH2 while transmitting the command CMDa to the memory device 610 through the first channel CH1. For example, the storage controller 620 may receive the data DATAb from the nonvolatile memory device 610 through the second channel CH2 while receiving the data DATAa from the nonvolatile memory device 610 through the first channel CH1.

The storage controller 620 may control overall operations of the nonvolatile memory device 610. The storage controller 620 may transmit a signal to the channels CH1 to CHm and may control each of the nonvolatile memories NVM11 to NVMmn connected to the channels CH1 to CHm. For example, the storage controller 620 may transmit the command CMDa and the address ADDRa to the first channel CH1 and may control one selected from among the nonvolatile memories NVM11 to NVM1n.

Each of the nonvolatile memories NVM11 to NVMmn may operate under the control of the storage controller 620. For example, the nonvolatile memory NVM11 may program the data DATAa based on the command CMDa, the address ADDRa and the data DATAa provided from the storage controller 620 through the first channel CH1. For example, the nonvolatile memory NVM21 may read the data DATAb based on the command CMDb and the address ADDRb provided from the storage controller 620 through the second channel CH2 and may transmit the read data DATAb to the storage controller 620 through the second channel CH2.

Although FIG. 9 illustrates an example where the nonvolatile memory device 610 communicates with the storage controller 620 through m channels and includes n nonvolatile memories corresponding to each of the channels, one or more embodiments are not limited thereto and the number of channels and the number of nonvolatile memories connected to one channel may be variously changed.

Hereinafter, one or more embodiments will be described in detail based on an example where the storage device is a UFS. However, one or more embodiments are not limited thereto, and one or more embodiments may be applied or employed to various storage devices such as SSD.

Figure 10:
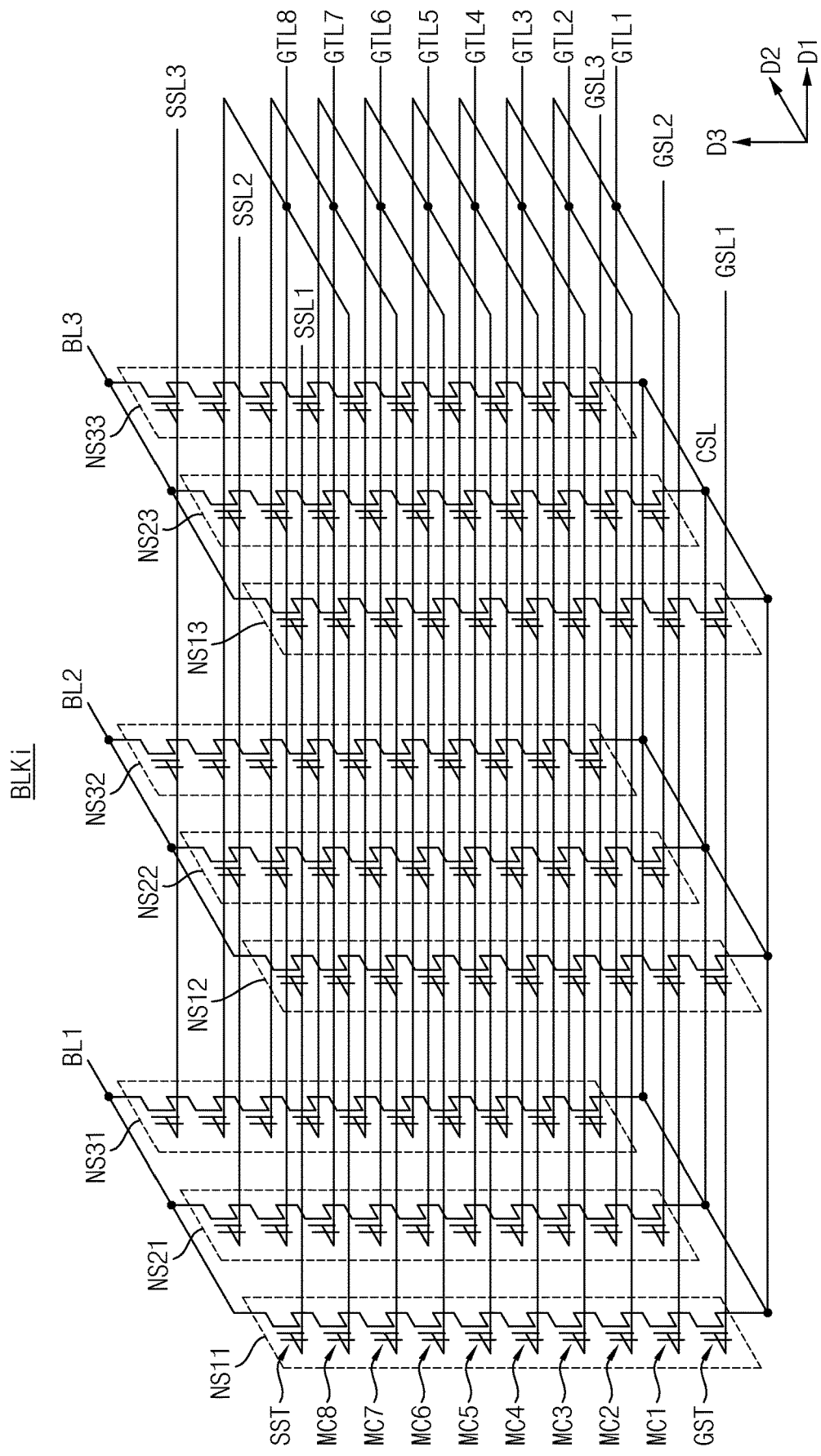
FIG. 10 is a circuit diagram illustrating an equivalent circuit of a memory block included in a nonvolatile memory device according to one or more embodiments.

FIG. 10 is a circuit diagram illustrating an equivalent circuit of a memory block included in a nonvolatile memory device according to one or more embodiments. Referring to FIG. 10, each memory block BLKi may be formed on a substrate in a three-dimensional structure (or a vertical structure). For example, NAND strings or cell strings included in the memory block BLKi may be formed in a vertical direction D3 perpendicular to an upper surface of a substrate. A first direction D1 and a second direction D2 are parallel to the upper surface of the substrate.

The memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 10, each of the NAND strings NS11 to NS33 is illustrated to include eight memory cells MC1 to MC8. However, embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same height may be commonly connected, and the ground selection lines GSL1 to GSL3 and the string selection lines SSL1 to SSL3 may be separated. In FIG. 10, the memory block BLKi is illustrated as being coupled to eight gate lines GTL1 to GTL8 and three bitlines BL1 to BL3. However, one or more embodiments are not limited thereto, and each memory block in the memory cell array may be coupled to various numbers of wordlines and various numbers of bitlines.

Figure 11:
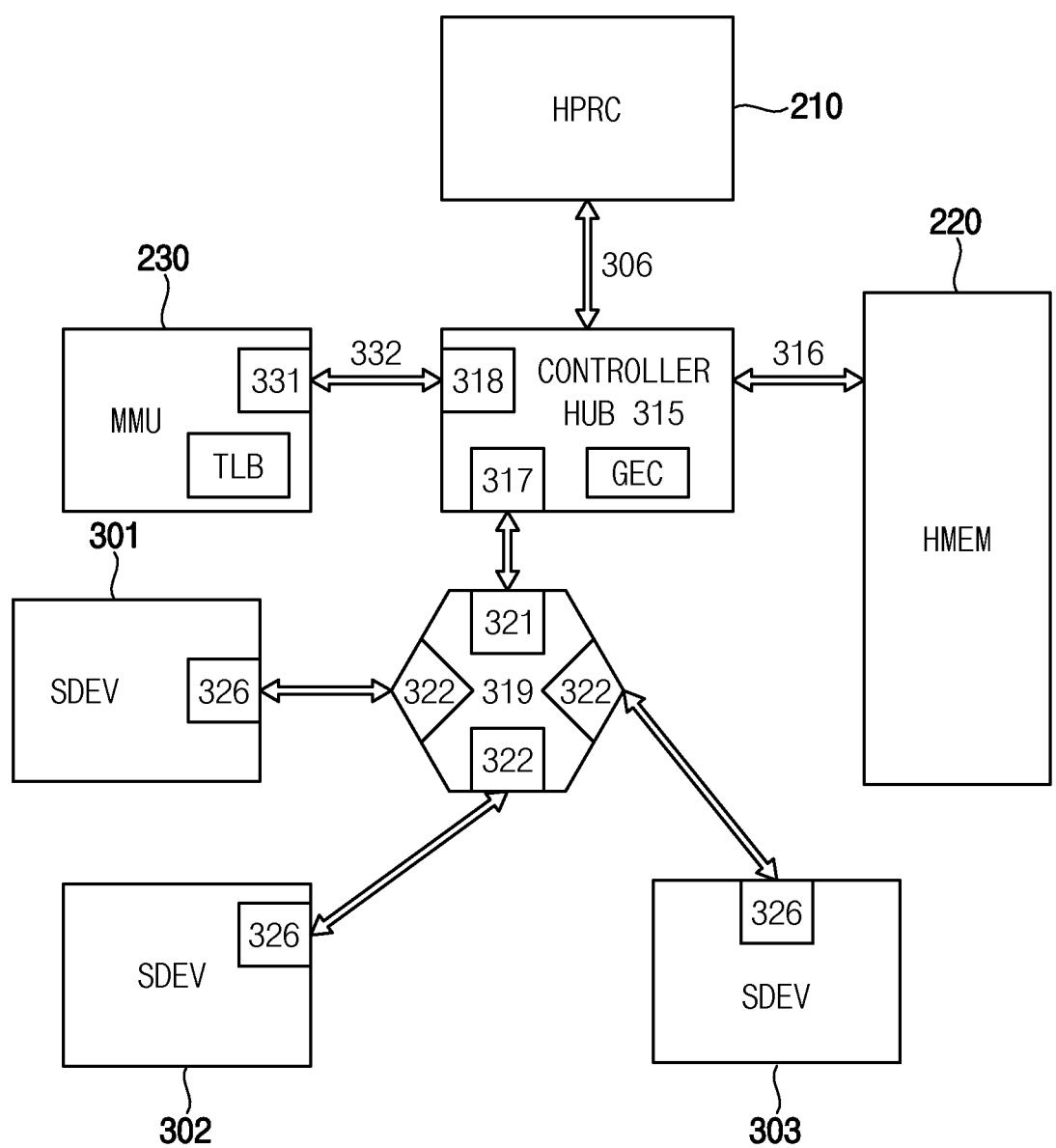
FIG. 11 is a block diagram illustrating an example embodiment of an interconnect architecture of a storage system according to one or more embodiments.

FIG. 11 is a block diagram illustrating an example embodiment of an interconnect architecture of a storage system according to one or more embodiments.

Referring to FIG. 11, an example embodiment of a design composed of point-to-point links that interconnect a set of components is illustrated. A system 102 includes host processor HPRC 210, a host memory device (or a system memory) HMEM 220 and a memory management unit MMU 230 coupled to a controller hub 315. The host processor 210 includes any processing element, such as a microprocessor, a host processor, an embedded processor, a co-processor, or other processor. The host processor 210 is coupled to the controller hub 315 through a front-side bus (FSB) 306. In one example embodiment, the FSB 306 is a serial point-to-point interconnect. In another example embodiment, the FSB 306 includes a serial, differential interconnect architecture that is compliant with a different interconnect standard.

The host memory 220 includes any memory device, such as random access memory (RAM), non-volatile (NV) memory, solid state memory, or other memory accessible by devices in the storage device 300. The host memory 220 is coupled to the controller hub 315 through a memory interface 316. Examples of a memory interface include a double-data rate (DDR) memory interface, a dual-channel DDR memory interface, and a dynamic RAM (DRAM) memory interface.

In one example embodiment, the controller hub 315 is a root hub, root complex, or root controller in a Peripheral Component Interconnect Express (PCIe or PCIE) interconnection hierarchy. Examples of the controller hub 315 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with the host processor 305, while the controller hub 315 is used to communicate with I/O devices, in a similar manner as described below. In one or more embodiments, peer-to-peer routing is optionally supported through the root complex or the controller hub 315.

Here, the controller hub 315 is coupled to a switch/bridge 319 through a serial link. Input/output modules 317 and 321, which may also be referred to as interfaces/ports 317 and 321, include/implement a layered protocol stack to provide communication between the controller hub 315 and the switch 319. In one example embodiment, multiple devices such as the storage devices SDEV 301, 302 and 303 may be coupled to the switch 319 through input/output modules 322 and 326. The controller hub 315 and the switch 319 may be a portion of the interconnector 50 as described with reference to FIG. 1.

The switch/bridge 319 routes packets/messages from storage devices 301, 302 and 303 upstream, i.e. up a hierarchy towards a root complex, to the controller hub 315 and downstream, i.e. down a hierarchy away from a root controller, from the processor 210 or the system memory 20 to the storage devices 301, 302 and 303. The switch 319, in one example embodiment, is referred to as a logical assembly of multiple virtual PCI-to-PCI bridge devices. The storage devices 301, 302 and 303 include any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such a device, is referred to as an endpoint. Although not specifically shown, the storage devices 301, 302 and 303 may include a PCIe to PCI/PCI-X bridge to support legacy or other version PCI devices. Endpoint devices in PCIe are often classified as legacy, PCIe, or root complex integrated endpoints.

The memory management unit 230 is also coupled to the controller hub 315 through a serial link 332. The I/O modules 331 and 318 are used to implement a layered protocol stack to communicate between the memory management unit 230 and the controller hub 315.

The memory management unit 230 may include a translation look aside buffer (TLB) configured to store the address mapping information referenced recently and/or frequently.

The erasure coding controller EC as described with reference to FIG. 1 may include a global erasure coding controller GEC disposed in the controller hub 315 as illustrated in FIG. 11. The global erasure coding controller GEC may perform the erasure coding commonly with respect to the plurality of storage devices 301, 302 and 303.

Figure 12:
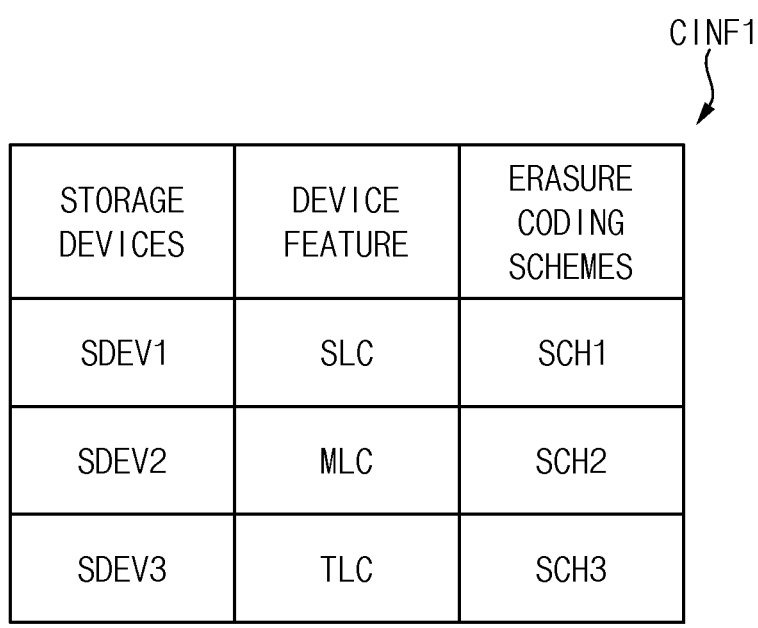
FIG. 12 is a diagram illustrating an example embodiment of coding information in a method of data recovery of a storage system according to one or more embodiments.
Figure 13:
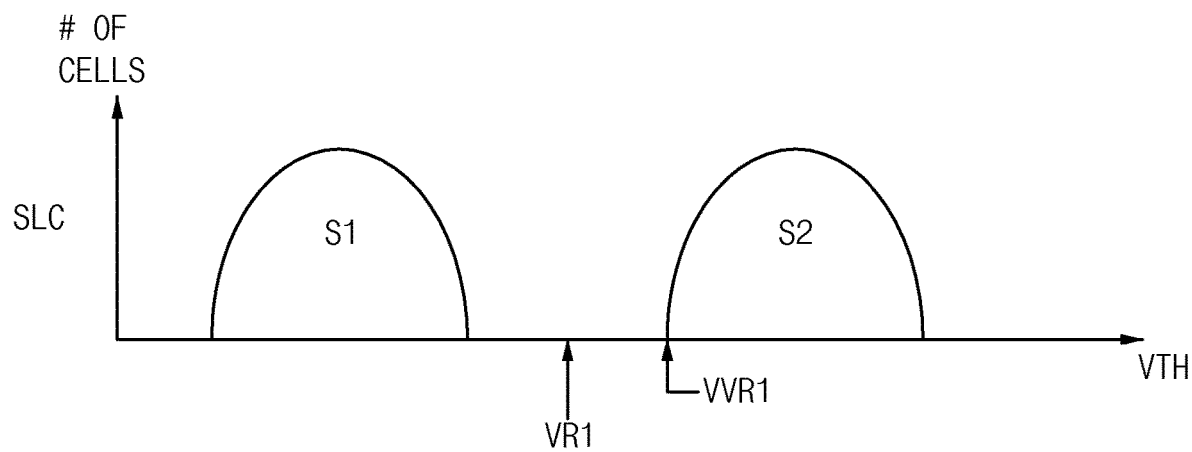
FIG. 13 is a diagram illustrating example storage schemes of a nonvolatile memory device associated with the coding information of FIG. 12.
Figure 13:
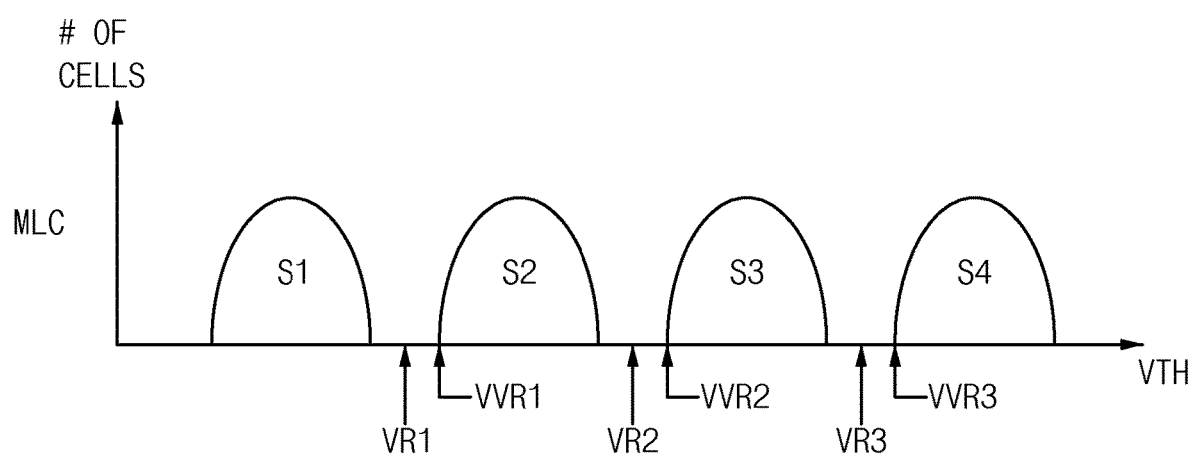
Figure 13:
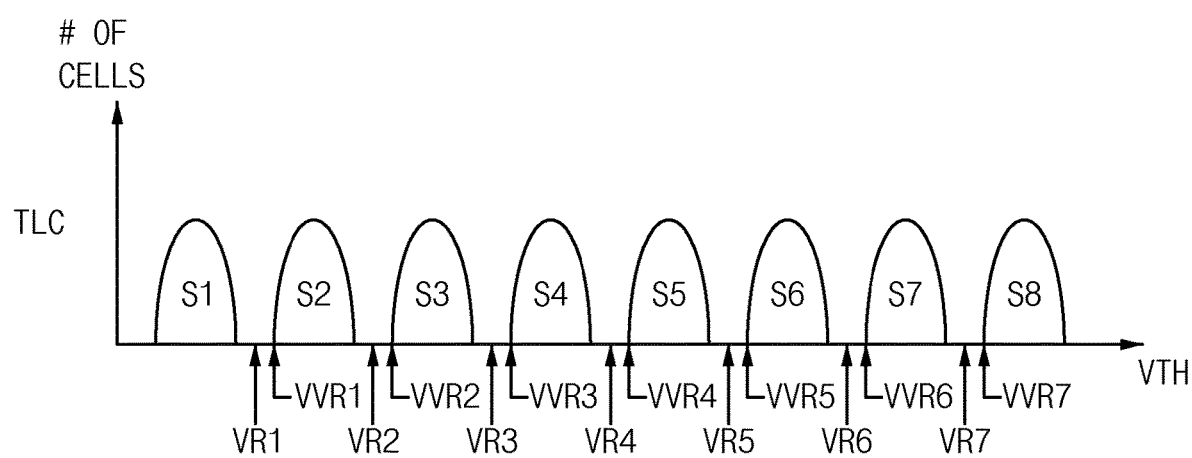

FIG. 12 is a diagram illustrating an example embodiment of coding information in a method of data recovery of a storage system according to one or more embodiments, and FIG. 13 is a diagram illustrating example storage schemes of a nonvolatile memory device associated with the coding information of FIG. 12.

Referring to FIG. 12, coding information CINF1 may be generated by setting each erasure coding scheme SCHi (i=1, 2, 3) corresponding to each storage device SDEVi of a plurality of storage devices SDEV1, SDEV2 and SDEV3, based on the device characteristics (or device feature) of the plurality of storage devices SDEV1, SDEV2 and SDEV3. In one embodiment, coding information CINF1 may be generated by setting one of erasure coding schemes SCHi (i=1, 2, 3) corresponding to a storage device SDEVi of the plurality of storage devices SDEV1, SDEV2 and SDEV3, based on the device characteristics (or device feature) of the plurality of storage devices SDEV1, SDEV2 and SDEV3.

In one or more embodiments, the device characteristics may be a data bit number that is stored in each memory cell of each storage device SDEVi. In one embodiment, the device characteristics may be a data bit number that is stored in a memory cell of a storage device SDEVi. The erasure coding manager ECM in FIG. 1 may set each erasure coding scheme SCHi corresponding to each storage device SDEVi based on the data bit number stored in each memory cell of each storage device SDEVi. In one embodiment, the erasure coding manager ECM in FIG. 1 may set an erasure coding scheme SCHi corresponding to a storage device SDEVi based on the data bit number stored in the memory cell of the storage device SDEVi.

FIG. 13 shows states respectively corresponding to a single-level cell (SLC) scheme in which the number of bits of data stored in each memory cell corresponds to 1, and a multi-level cell (MLC) scheme in which the number of bits of data stored in each memory cell corresponds to 2 and a triple-level cell (TLC) scheme in which the number of bits of data stored in each memory cell corresponds to 3.

In FIG. 13, a horizontal axis represents the threshold voltage VTH of a memory cell, and a vertical axis represents the number of memory cells corresponding to the threshold voltage VTH. In the case of SLC, 1-bit data stored in each memory cell can be distinguished into two states S1 and S2. In the case of MLC, 2-bit data stored in each memory cell is distinguished into 4 states S1~S4. In the case of TLC, 3-bit data stored in each memory cell can be distinguished into eight states S1~S8.

During a program operation, program execution results for the first to eighth states S1~S8 may be determined by sequentially applying the first though seventh verification read voltages VVR1~VVR7 to the selected wordline. Also, during a read operation, each bit of the first through eighth states S1~S8 may be determined by sequentially applying at least a portion of the normal read voltages VR1~VR7 to the selected wordline.

As the number of bits stored in each memory cell increases, the read margin between states decreases, the failure probability of ECC decoding increases, and the probability of data loss increases. In other words, the data loss probability of the MLC scheme is greater than the data loss probability of the SLC scheme, and the data loss probability of the TLC scheme is greater than the data loss probability of the MLC scheme.

Accordingly, an erasure coding scheme having higher data recovery performance may be set for a storage device having a higher data loss probability. In other words, as shown in FIG. 12, the first erasure coding scheme SCH1 is set to the first storage device SDEV1 to which the SLC scheme is applied, the second erasure coding scheme SCH2 having higher data recovery performance than the first erasure coding scheme SCH1 is set to the second storage device SDEV2 to which the MLC scheme is applied, the third erasure coding scheme SCH3 having higher data recovery performance than the second erasure coding scheme SCH2 is set to the third storage device SDEV3 to which the TLC scheme is applied.

The host device 200 of FIG. 1 may determine the target storage device in which the original data is to be stored among the plurality of storage devices SDEV1, SDEV2 and SDEV3, according to the policy of the storage system about data storage conditions, data storage schemes, etc. In this case, an erasure coding scheme corresponding to the target storage device may be determined as the target erasure coding scheme based on the predetermined coding information CINF1. In other words, the first erasure coding scheme SCH1 may be determined as the target erasure coding scheme according to the coding information CINF1 when the original data is determined to be stored in the first storage device SDEV1 (or based on the original data that is determined to be stored in the first storage device SDEV1). The second erasure coding scheme SCH2 may be determined as the target erasure coding scheme according to the coding information CINF1 when the original data is determined to be stored in the second storage device SDEV2 (or based on the original data that is determined to be stored in the second storage device SDEV2). The third erasure coding scheme SCH3 may be determined as the target erasure coding scheme according to the coding information CINF1 when the original data is determined to be stored in the third storage device SDEV3 (or based on the original data that is determined to be stored in the third storage device SDEV3).

Figures 14, 15:
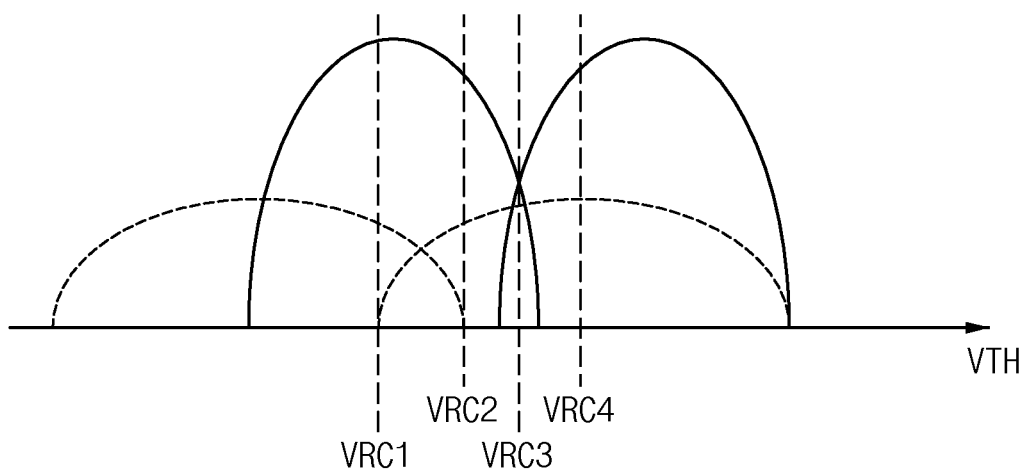
FIG. 14 is a diagram illustrating an example embodiment of coding information in a method of data recovery of a storage system according to one or more embodiments.
FIG. 15 is a diagram illustrating example distribution data of a nonvolatile memory device associated with the coding information of FIG. 14.

FIG. 14 is a diagram illustrating an example embodiment of coding information in a method of data recovery of a storage system according to one or more embodiments, and FIG. 15 is a diagram illustrating example distribution data of a nonvolatile memory device associated with the coding information of FIG. 14.

Referring to FIG. 14, coding information CINF2 may be generated by setting each erasure coding scheme SCHi (i=1, 2, 3) corresponding to each storage device SDEVi of a plurality of storage devices SDEV1, SDEV2 and SDEV3 based on the device characteristics (or device feature) of the plurality of storage devices SDEV1, SDEV2 and SDEV3.

In one or more embodiments, the device characteristics may be a degeneration degree of each storage device SDEVi. In one embodiment, the device characteristics may be a degeneration degree of a storage device SDEVi. The erasure coding manager ECM in FIG. 1 may set each erasure coding scheme SCHi corresponding to each storage device SDEVi based on the degeneration degree of each storage device SDEVi. In one embodiment, the erasure coding manager ECM in FIG. 1 may set an erasure coding scheme SCHi corresponding to a storage device SDEVi based on a degeneration degree of a storage device SDEVi.

FIG. 15 illustrates two adjacent states corresponding to a first case and a second case. The two adjacent states of the first case is represented by solid lines where the degeneration degree of the retention characteristics of a memory block included in the storage device is relatively small, and the two adjacent states of the second case is represented by dotted lines where the degeneration degree of the retention characteristics of the memory block is relatively large. As the degeneration degree of the retention characteristic increases, the threshold voltage distribution broadens and the threshold voltage decreases further.

For example, by performing read operations on one wordline of the memory block based on a plurality of cell count read voltages VRC1~VRC4, the number of memory cells corresponding to a plurality of threshold voltage ranges may be provided cell count information. In general, a storage system generates and manages the cell count information for control of the storage device.

As the degeneration degree of retention characteristics of each storage device increases, the bit error rate of read data increases, the probability of ECC decoding failure increases, and the probability of data loss increases.

Accordingly, an erasure coding scheme having higher data recovery performance may be set for a storage device having a higher degeneration degree in retention characteristics. For example, the cell count CC in FIG. 14 may indicate the number of on-cells, and in this case, as the cell count (CC) increases, it may indicate that the degeneration degree of the retention characteristic increases. The entire range of the cell count CC may be divided by the reference values c1 and c2 as shown in FIG. 14, and each erasure coding scheme SCHi corresponding to each storage device SDEVi may be set according to the divided ranges of the cell count CC. In other words, as shown in FIG. 14, the first erasure coding scheme SCH1 may be set to the first storage device SDEV1 having the lowest degeneration degree of retention characteristics, the second erasure coding scheme SCH2 having the higher data recovery performance than the first erasure coding scheme SCH1 may be set to the second storage device SDEV2 having the intermediate degeneration degree of retention characteristics, and the third erasure coding scheme SCH3 having the higher data recovery performance than the second erasure coding scheme SCH2 may be set to the third storage device SDEV3 having the highest degeneration degree of retention characteristics.

As described with reference to FIGS. 12 and 13, the host device 200 of FIG. 1 may determine the target storage device in which the original data is to be stored, and then an erasure coding scheme corresponding to the target storage device may be determined as the target erasure coding scheme based on the predetermined coding information CINF2. In other words, the first erasure coding scheme SCH1 may be determined as the target erasure coding scheme according to the coding information CINF2 when the original data is determined to be stored in the first storage device SDEV1 (or based on the original data that is determined to be stored in the first storage device SDEV1). The second erasure coding scheme SCH2 may be determined as the target erasure coding scheme according to the coding information CINF2 when the original data is determined to be stored in the second storage device SDEV2 (or based on the original data that is determined to be stored in the second storage device SDEV2). The third erasure coding scheme SCH3 may be determined as the target erasure coding scheme according to the coding information CINF2 when the original data is determined to be stored in the third storage device SDEV3 (or based on the original data that is determined to be stored in the third storage device SDEV3).

Figure 16:
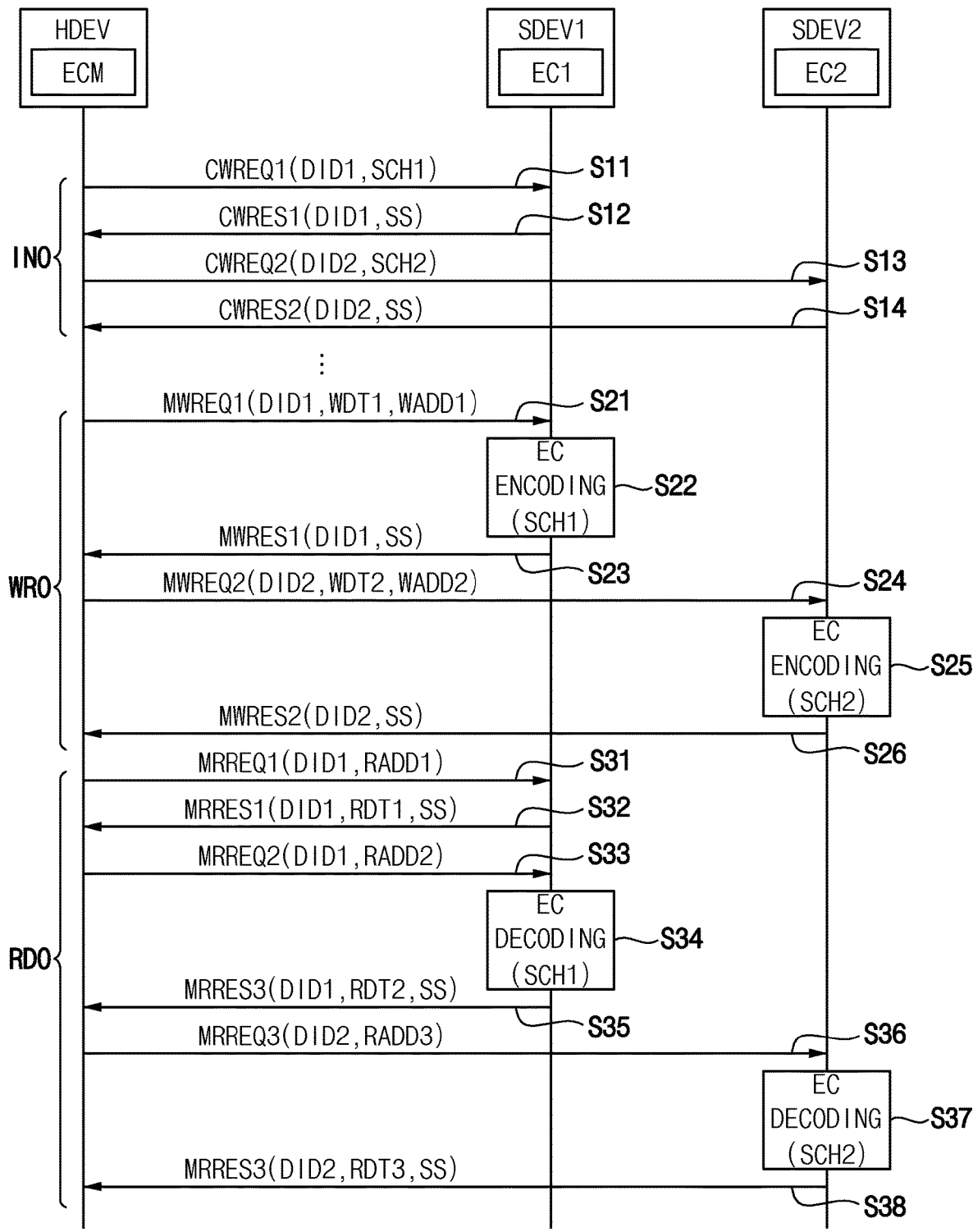
FIG. 16 is a diagram illustrating an example operation of a storage system according to one or more embodiments.

FIG. 16 is a diagram illustrating an example operation of a storage system according to one or more embodiments.

FIG. 16 illustrates an initialization operation INO, a write operation WRO and a read operation RDO, which are performed between a host device HDEV and a plurality of storage device SDEV1 and SDEV2. The initialization operation INO may include booting, rebooting, and resetting with respect to at least one of the host device HDEV and the storage devices SDEV1 and SDEV2. The write operation WRO may indicate storing the data stripe corresponding to the original data in the storage devices SDEV1 and SDEV2 by performing the erasure code encoding according to the target erasure coding scheme. The read operation RDO may indicate reading out the original data from the storage devices SDEV1 and SDEV2 with or without the erasure code decoding. FIG. 16 illustrates the two storage devices, that is, a first storage device SDEV1 and a second storage device SDEV2, but is not limited to a particular number of storage devices.

The erasure coding manager ECM of the host device HDEV may generate the coding information based on the device characteristics as described with reference to FIGS. 12 through 15. The coding information may be transferred to the storage devices SDEV1 and SDEV2 during the initialization operation INO.

The host device HDEV may transfer, to the first storage device SDEV1, a first configuration write request CWREQ1 including a first device identifier DID1 indicating the first storage device SDEV1 and a first erasure coding scheme SCH1 corresponding to the first storage device SDEV1 (S11). The first storage device SDEV1 may set the first erasure coding scheme SCH1 in a first local erasure coding controller EC1, and transfer, to the host device HDEV, a first configuration write response CWRES1 including the first device identifier DID1 and setting success information SS (S12).

In addition, the host device HDEV may transfer, to the second storage device SDEV2, a second configuration write request CWREQ2 including a second device identifier DID2 indicating the second storage device SDEV2 and a second erasure coding scheme SCH2 corresponding to the second storage device SDEV2 (S13). The second storage device SDEV2 may set the second erasure coding scheme SCH2 in a second local erasure coding controller EC2, and transfer, to the host device HDEV, a second configuration write response CWRES2 including the second device identifier DID2 and setting success information SS (S14).

The host device HDEV may transfer, to the first storage device SDEV1, a first memory write request MWREQ1 including the first device identifier DID1, a first write data WDT1 and a first write address WADD1 (S21). The first local erasure coding controller EC1 may generate a data stripe by performing the erasure code encoding of the first write data WDT1 according to the first erasure coding scheme SCH1 (S22), and the first storage device SDEV1 may store the data stripe corresponding to the first write data WDT1 in the nonvolatile memory device of the first storage device SDEV1. After the data stripe is stored, the first storage device SDEV1 may transfer, to the host device HDEV, a first memory write response MWRES1 including the first device identifier DID1 and writing success information SS (S23).

In addition, the host device HDEV may transfer, to the second storage device SDEV2, a second memory write request MWREQ2 including the second device identifier DID2, a second write data WDT2 and a second write address WADD2 (S24). The second local erasure coding controller EC2 may generate a data stripe by performing the erasure code encoding of the second write data WDT2 according to the second erasure coding scheme SCH2 (S25), and the second storage device SDEV2 may store the data stripe corresponding to the second write data WDT2 in the nonvolatile memory device of the second storage device SDEV2. After the data stripe is stored, the second storage device SDEV2 may transfer, to the host device HDEV, a second memory write response MWRES2 including the second device identifier DID2 and writing success information SS (S26).

The host device HDEV may transfer, to the first storage device SDEV1, a first memory read request MRREQ1 including the first device identifier DID1 and a first read address RADD1 (S31). When the first storage device SDEV1 succeeds in reading out a first read data RDT1 corresponding to the first read address RADD1, the first storage device SDEV1 may transfer, to the host device HDEV, a first memory read response MRRES1 including the first device identifier DID1, the first read data RDT1 and reading success information SS (S32).

The host device HDEV may transfer, to the first storage device SDEV1, a second memory read request MRREQ2 including the first device identifier DID1 and a second read address RADD2 (S33). When the first storage device SDEV1 fails in reading out a second read data RDT2 corresponding to the second read address RADD2, the first storage device SDEV1 may read out the data stripe including the second read data RDT2 from the nonvolatile memory device of the first storage device SDEV1 and restore the second read data RDT2 by performing the erasure code decoding according to the first erasure coding scheme SCH1 (S34). When the first storage device SDEV1 succeeds in restoring the second read data RDT2, the first storage device SDEV1 may transfer, to the host device HDEV, a second memory read response MRRES2 including the first device identifier DID1, the second read data RDT2 and reading success information SS (S35).

The host device HDEV may transfer, to the second storage device SDEV1, a third memory read request MRREQ3 including the second device identifier DID2 and a third read address RADD3 (S36). When the second storage device SDEV2 fails in reading out a third read data RDT3 corresponding to the third read address RADD3, the second storage device SDEV2 may read out the data stripe including the third read data RDT3 from the nonvolatile memory device of the second storage device SDEV2 and restore the third read data RDT3 by performing the erasure code decoding according to the second erasure coding scheme SCH2 (S37). When the second storage device SDEV2 succeeds in restoring the third read data RDT3, the second storage device SDEV2 may transfer, to the host device HDEV, a third memory read response MRRES3 including the second device identifier DID2, the third read data RDT3 and reading success information SS (S38).

As such, when the coding information is generated based on the device characteristics, each erasure coding scheme corresponding to each storage device may be set in advance during the initialization operation INO, and the write operation WRO and the read operation RDO may be performed without transfer of the target erasure coding scheme.

Figure 17:
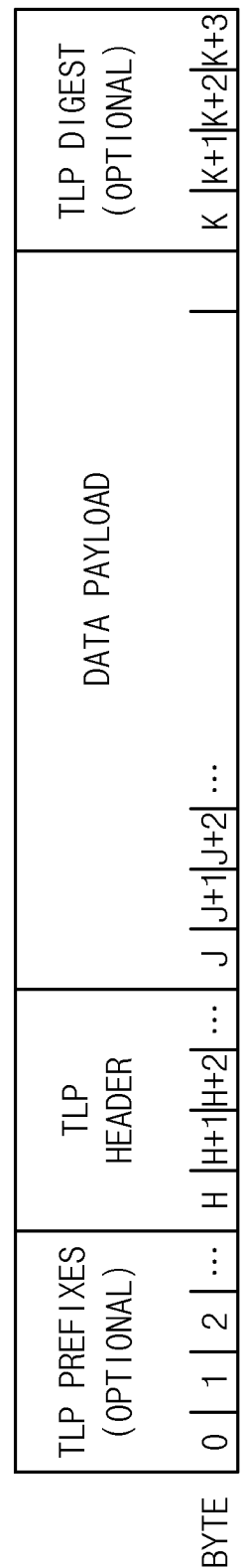
FIG. 17 is a diagram illustrating an example of a packet that is transferred in a storage system according to one or more embodiments.

FIG. 17 is a diagram illustrating an example of a packet that is transferred in a storage system according to one or more embodiments.

FIG. 17 illustrates a format of a transaction layer packet (TLP) that is generated and managed by a transaction layer of a PCIe architecture.

The Transactions consists of requests and completions (or responses), which are communicated using packets. As illustrated in FIG. 17, a TLP may include one or more optional TLP Prefixes, a TLP header, a data payload, and an optional TLP Digest, which are allocated to a plurality of bytes (BYTE 0~k+3).

The memory write request, the memory write response, the configuration write request, the configuration write response, the configuration read request and the configuration read response as described above may correspond to the TLPs as illustrated in FIG. 17. The TLP header may include various information such as a device identifier, success information for the corresponding request and so on, and the data payload may include the target erasure coding scheme, the write data, the read data and so on.

Figure 18:
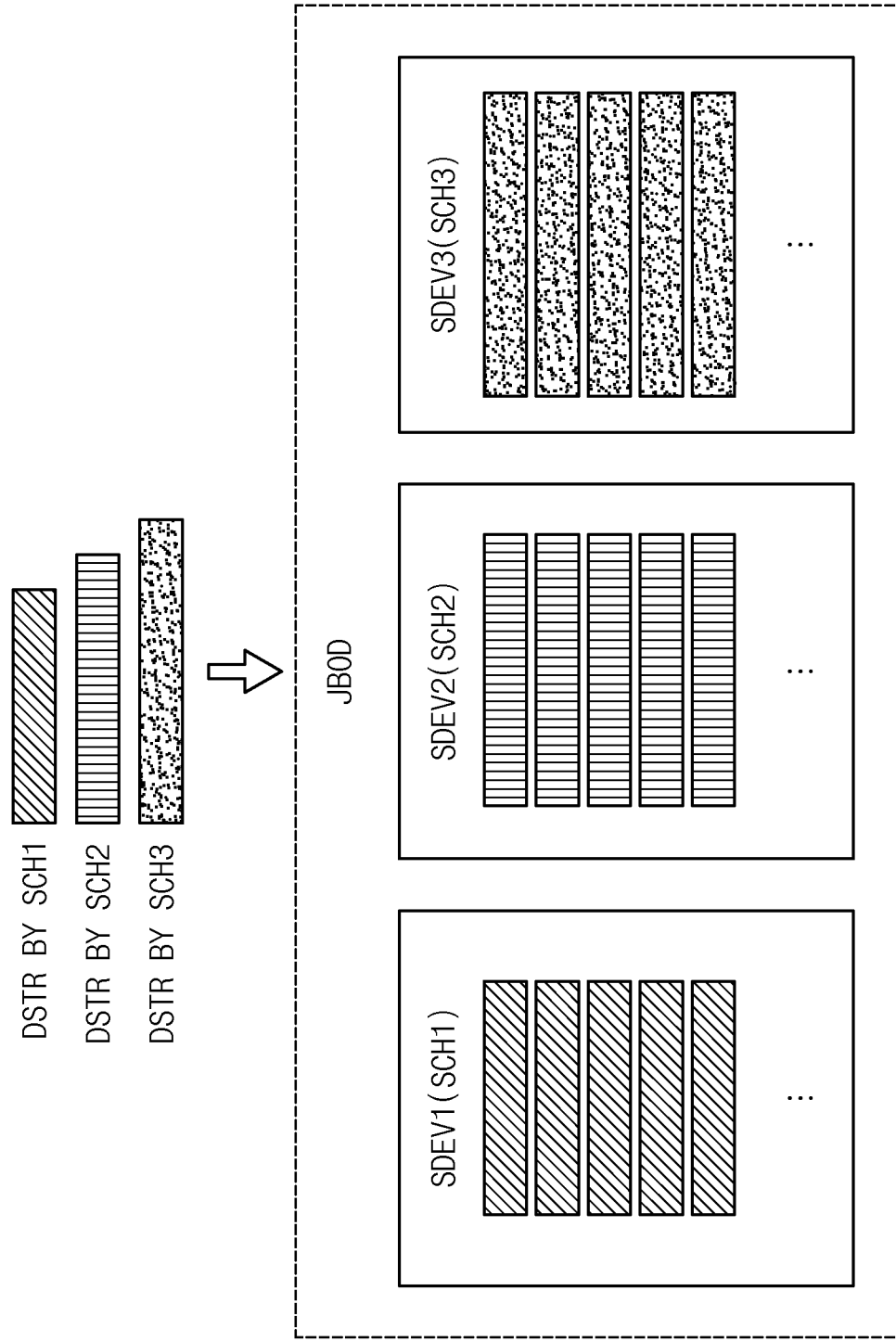
FIG. 18 is a diagram illustrating an example of storing data in a storage system according to one or more embodiments.

FIG. 18 is a diagram illustrating an example of storing data in a storage system according to one or more embodiments. Referring to FIG. 18, a first erasure coding scheme SCH1 may be set to a first storage device SDEV1, a second erasure coding scheme SCH2 may be set to a second storage device SDEV2, and a third erasure coding scheme SCH3 may be set to a third storage device SDEV3. The target erasure coding scheme corresponding to each storage device may be set using the coding information as described with reference to FIGS. 12 through 16. The first storage device SDEV1, the second erasure coding scheme SCH2 and the third storage device SDEV3 may form a JBOD (Just Bunch Of Disks).

In this case, as illustrated in FIG. 18, the data stripes DSTR encoded by the first erasure coding scheme SCH1 may be dedicatedly stored in the first storage device SDEV1, the data stripes DSTR encoded by the second erasure coding scheme SCH2 may be dedicatedly stored in the first storage device SDEV2, and the data stripes DSTR encoded by the third erasure coding scheme SCH3 may be dedicatedly stored in the third storage device SDEV3.

Figure 19:
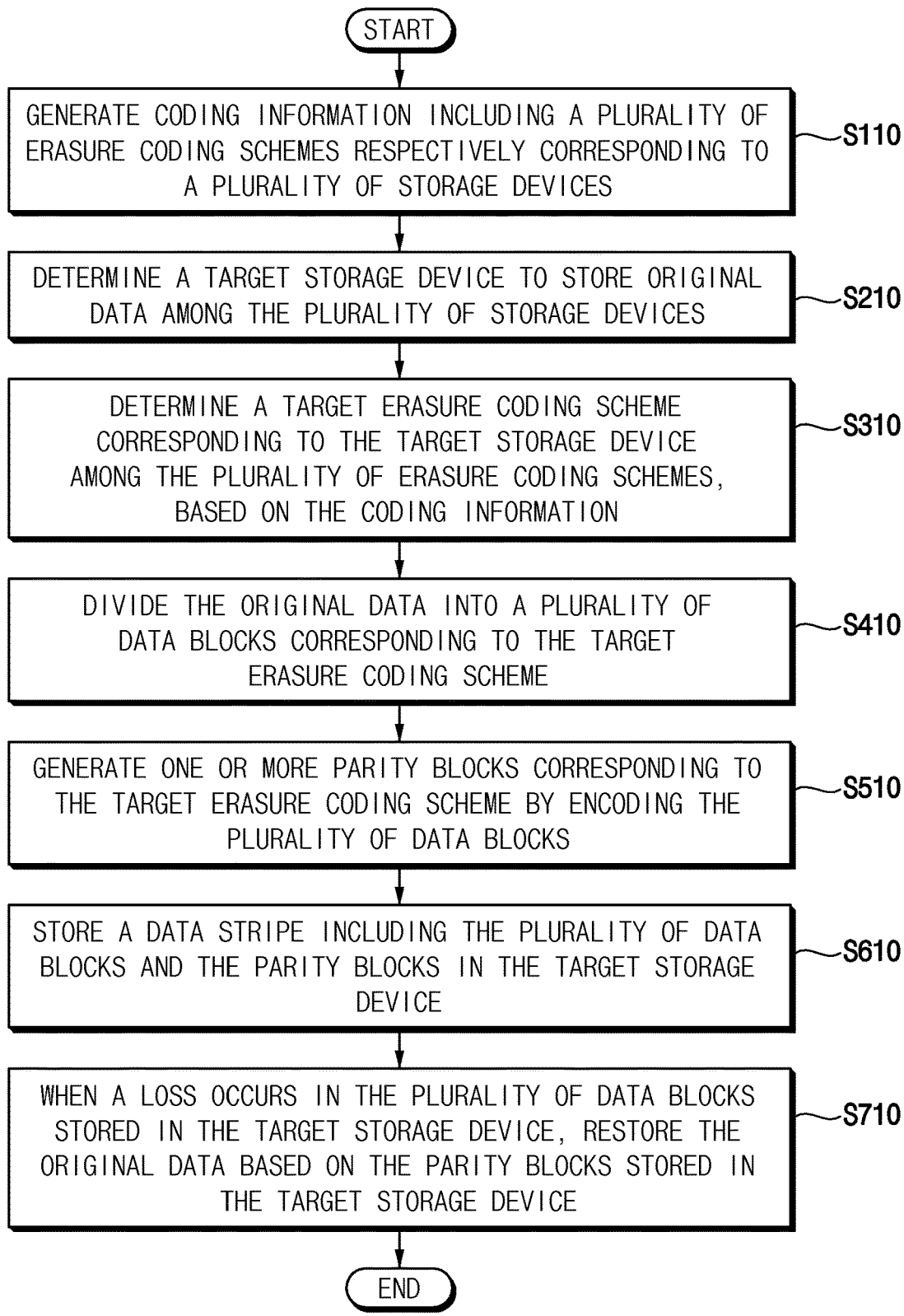
FIG. 19 is a flowchart illustrating a method of data recovery of a storage system according to one or more embodiments.

FIG. 19 is a flowchart illustrating a method of data recovery of a storage system according to one or more embodiments. FIG. 19 illustrates a method of data recovery of a storage system using the coding information based on the device characteristics as described with reference to FIGS. 12 through 18.

Referring to FIGS. 1 and 19, the erasure coding manager ECM may generate coding information including a plurality of erasure coding schemes respectively corresponding to a plurality of storage devices (S110). The coding information may be the coding information CINF1 of FIG. 12 or the coding information CINF2 of FIG. 14.

The host device 200 may determine a target storage device to store original data among the plurality of storage devices (S210). The host device 200 transfer a request including a device identifier corresponding to the target storage device that is determined for a read operation or a write operation to the plurality of storage devices 300.

The erasure coding controller EC may determine a target erasure coding scheme corresponding to the target storage device among the plurality of erasure coding schemes, based on the coding information (S310). As described with reference to FIG. 6, each storage device SDEVi (i=1, 2, 3) may include each local erasure coding controller ECi, and the each target erasure coding scheme may be set in each local erasure coding controller ECi.

Each local erasure coding controller ECi included in the target storage device may divide the original data into a plurality of data blocks corresponding to the target erasure coding scheme (S410), and generate one or more parity blocks corresponding to the target erasure coding scheme by encoding the plurality of data blocks (S510).

The target storage device may store a data stripe including the plurality of data blocks and the parity blocks in the target storage device (S610). The target storage device may restore the original data based on the parity blocks stored in the target storage device, when a loss occurs in the plurality of data blocks stored in the target storage device (S710).

Figure 20:
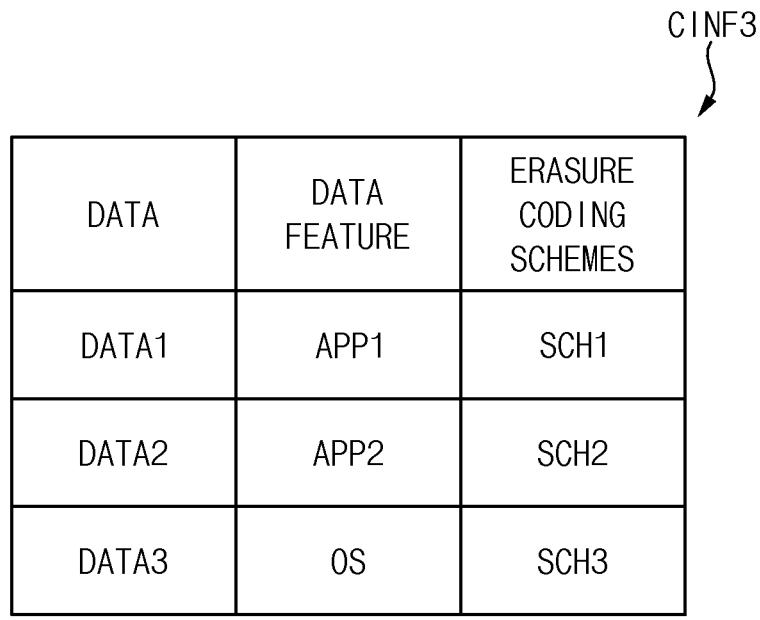
FIGS. 20 and 21 are diagrams illustrating one or more embodiments of coding information in a method of data recovery of a storage system according to one or more embodiments.
Figure 21:
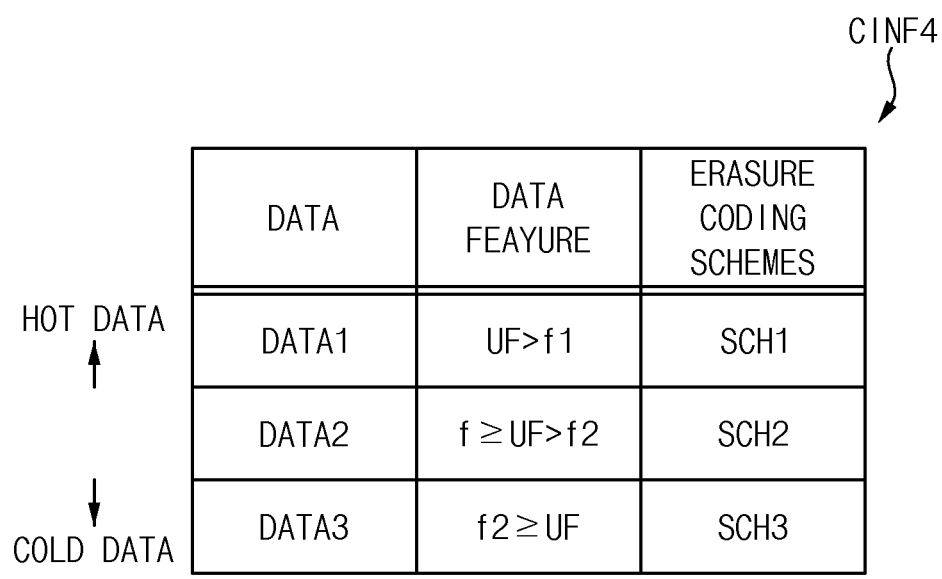

FIGS. 20 and 21 are diagrams illustrating one or more embodiments of coding information in a method of data recovery of a storage system according to one or more embodiments.

Referring to FIGS. 20 and 21, coding information CINF3 or CINF4 may be generated by setting each erasure coding scheme SCHi (i=1, 2, 3) to each data DATAi of a plurality of data DATA1, DATA2 and DATA3 based on the data characteristics. The target erasure coding scheme corresponding to the original data to be stored in the target storage device may be determined based on the coding information CINF3 or CINF4.

In one or more embodiments, as illustrated in FIG. 20, the data characteristics may be an importance degree or a type of data. For example, the first data DATA1 may be user data associated with a first application APP1, the second data DATA2 may be user data associated with a second application APP2, and the third data DATA3 may be system metadata associated with an operating system (OS) of the storage system.

An erasure coding scheme having a higher data recovery performance may be set to the original data, as the original data is important data requiring higher degree of protection. In other words, as illustrated in FIG. 20, the erasure coding scheme SCH3 of a relatively higher data recovery performance is set as the target erasure coding scheme when the original data corresponds to the system metadata, whereas the erasure coding scheme SCH1 or SCH2 of a relatively lower data recovery performance is set as the target erasure coding scheme when the original data corresponds to the user data. In one embodiment, as illustrated in FIG. 20, the erasure coding scheme SCH3 of a relatively higher data recovery performance is set as the target erasure coding scheme based on the original data corresponding to the system metadata, and the erasure coding scheme SCH1 or SCH2 of a relatively lower data recovery performance is set as the target erasure coding scheme based on the original data corresponding to the user data.

In one or more embodiments, as illustrated in FIG. 21, the data characteristics may be an update frequency UF of data. Here, the update frequency UF indicates an average frequency of changing the data stored in the nonvolatile memory device of the storage device.

In general, in the technical field of nonvolatile memory devices, data having a relatively high update frequency is referred to as hot data, and data having a relatively low update frequency is referred to as cold data. Because hot data is frequently updated, the time of hot data required to be retained in the storage device is shorter than that of cold data. Assuming that retention characteristics of nonvolatile memory devices are the same, the probability of loss of cold data is greater than the probability of loss of hot data.

The entire range of the update frequency UF may be divided by the reference values f1 and f2 as shown in FIG. 21, and each erasure coding scheme SCHi corresponding to each data DATAi may be set according to the divided ranges of the update frequency UF. In other words, as shown in FIG. 21, the first erasure coding scheme SCH1 may be set to the first data DATA1 having the highest update frequency, the second erasure coding scheme SCH2 having the higher data recovery performance than the first erasure coding scheme SCH1 may be set to the second data DATA2 having an intermediate update frequency, and the third erasure coding scheme SCH3 having the higher data recovery performance than the second erasure coding scheme SCH2 may be set to the third data DATA3 having the lowest update frequency.

Figure 22:
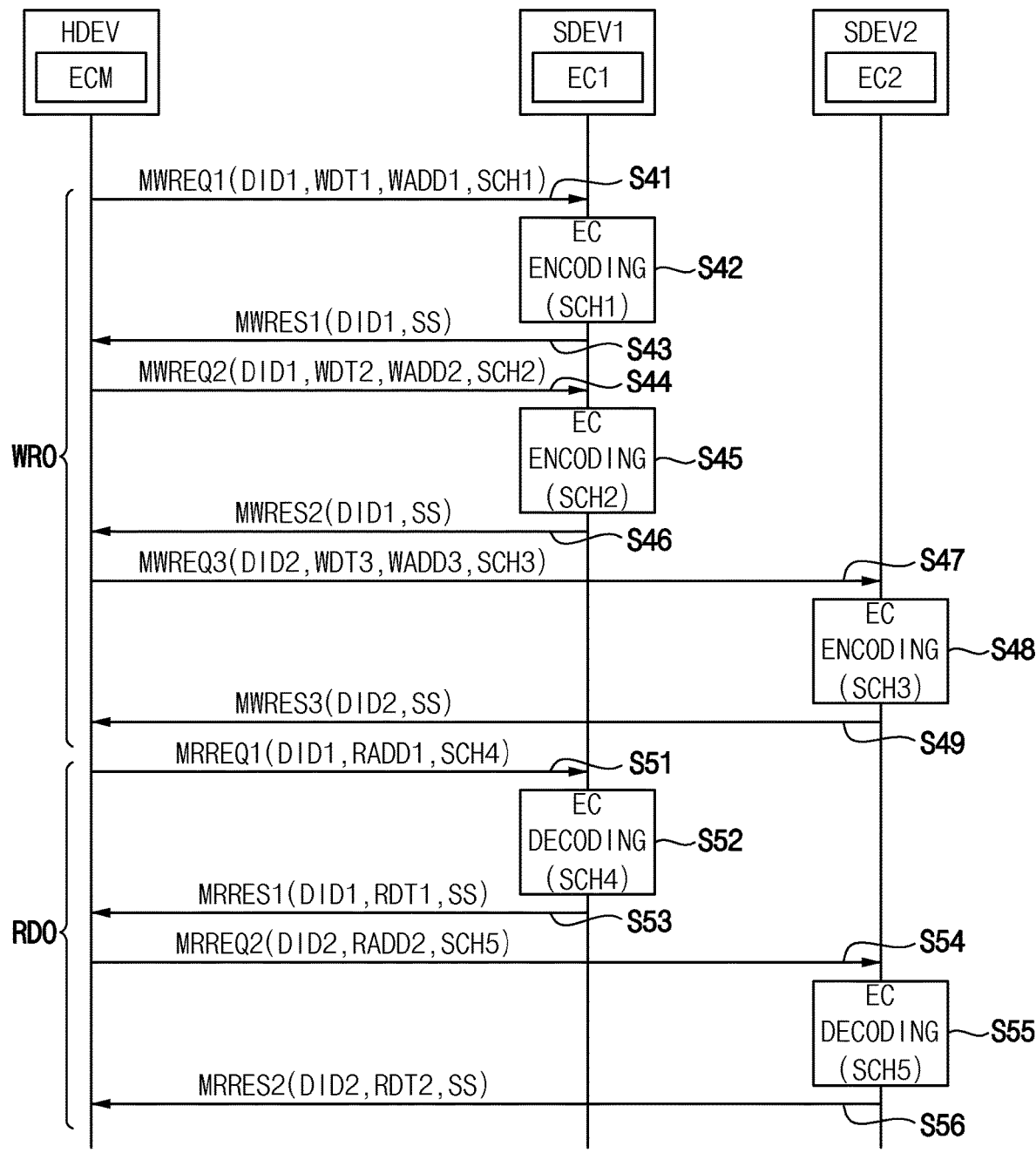
FIG. 22 is a diagram illustrating an example operation of a storage system according to one or more embodiments.

FIG. 22 is a diagram illustrating an example operation of a storage system according to one or more embodiments. FIG. 22 illustrates a write operation WRO and a read operation RDO, which are performed between a host device HDEV and a plurality of storage device SDEV1 and SDEV2. The write operation WRO may indicate storing the data stripe corresponding to the original data in the storage devices SDEV1 and SDEV2 by performing the erasure code encoding according to the target erasure coding scheme. The read operation RDO may indicate reading out the original data from the storage devices SDEV1 and SDEV2 with or without the erasure code decoding. FIG. 22 illustrates the two storage devices, that is, a first storage device SDEV1 and a second storage device SDEV2, but is not limited to a particular number of storage devices.

The erasure coding manager ECM of the host device HDEV may generate the coding information based on the data characteristics as described with reference to FIGS. 20 and 21. The target erasure coding scheme determined by the coding information may be transferred on the fly to the storage devices SDEV1 and SDEV2 through write request and read requests.

The host device HDEV may transfer, to the first storage device SDEV1, a first memory write request MWREQ1 including the first device identifier DID1, a first write data WDT1, a first write address WADD1 and a first erasure coding scheme SCH1 (S41). The first local erasure coding controller EC1 may generate a data stripe by performing the erasure code encoding of the first write data WDT1 according to the first erasure coding scheme SCH1 (S42), and the first storage device SDEV1 may store the data stripe corresponding to the first write data WDT1 in the nonvolatile memory device of the first storage device SDEV1. After the data stripe is stored, the first storage device SDEV1 may transfer, to the host device HDEV, a first memory write response MWRES1 including the first device identifier DID1 and writing success information SS (S43).

The host device HDEV may transfer, to the first storage device SDEV1, a second memory write request MWREQ2 including the first device identifier DID1, a second write data WDT2, a second write address WADD2 and a second erasure coding scheme SCH2 (S44). The first local erasure coding controller EC1 may generate a data stripe by performing the erasure code encoding of the second write data WDT2 according to the second erasure coding scheme SCH2 (S45), and the first storage device SDEV1 may store the data stripe corresponding to the second write data WDT2 in the nonvolatile memory device of the first storage device SDEV1. After the data stripe is stored, the first storage device SDEV1 may transfer, to the host device HDEV, a second memory write response MWRES2 including the first device identifier DID1 and writing success information SS (S46).

The host device HDEV may transfer, to the second storage device SDEV2, a third memory write request MWREQ3 including the second device identifier DID2, a third write data WDT3, a third write address WADD3 and a third erasure coding scheme SCH3 (S47). The second local erasure coding controller EC2 may generate a data stripe by performing the erasure code encoding of the third write data WDT3 according to the third erasure coding scheme SCH3 (S48), and the second storage device SDEV2 may store the data stripe corresponding to the third write data WDT3 in the nonvolatile memory device of the second storage device SDEV2. After the data stripe is stored, the second storage device SDEV2 may transfer, to the host device HDEV, a third memory write response MWRES3 including the second device identifier DID2 and writing success information SS (S49).

The host device HDEV may transfer, to the first storage device SDEV1, a first memory read request MRREQ1 including the first device identifier DID1, a first read address RADD1 and a fourth erasure coding scheme SCH4 (S51). When the first storage device SDEV1 fails in reading out a first second read data RDT1 corresponding to the first read address RADD1, the first storage device SDEV1 may read out the data stripe including the first read data RDT1 from the nonvolatile memory device of the first storage device SDEV1 and restore the first read data RDT1 by performing the erasure code decoding according to the fourth erasure coding scheme SCH4 (S52). When the first storage device SDEV1 succeeds in restoring the first read data RDT1, the first storage device SDEV1 may transfer, to the host device HDEV, a first memory read response MRRES1 including the first device identifier DID1, the first read data RDT1 and reading success information SS (S53).

The host device HDEV may transfer, to the second storage device SDEV2, a second memory read request MRREQ2 including the second device identifier DID2, a second read address RADD2 and a fifth erasure coding scheme SCH5 (S54). When the second storage device SDEV2 fails in reading out a second read data RDT2 corresponding to the second read address RADD2, the second storage device SDEV2 may read out the data stripe including the second read data RDT2 from the nonvolatile memory device of the second storage device SDEV2 and restore the second read data RDT2 by performing the erasure code decoding according to the fifth erasure coding scheme SCH4 (S55). When the second storage device SDEV2 succeeds in restoring the second read data RDT2, the second storage device SDEV2 may transfer, to the host device HDEV, a second memory read response MRRES2 including the second device identifier DID2, the second read data RDT2 and reading success information SS (S56).

As such, when the coding information is generated based on the data characteristics, the target erasure coding scheme may be transferred from the host device HDEV to the storage devices SDEV1 and SDEV2 on the fly when the write operation WRO and the read operation RDO are performed.

Figure 23:
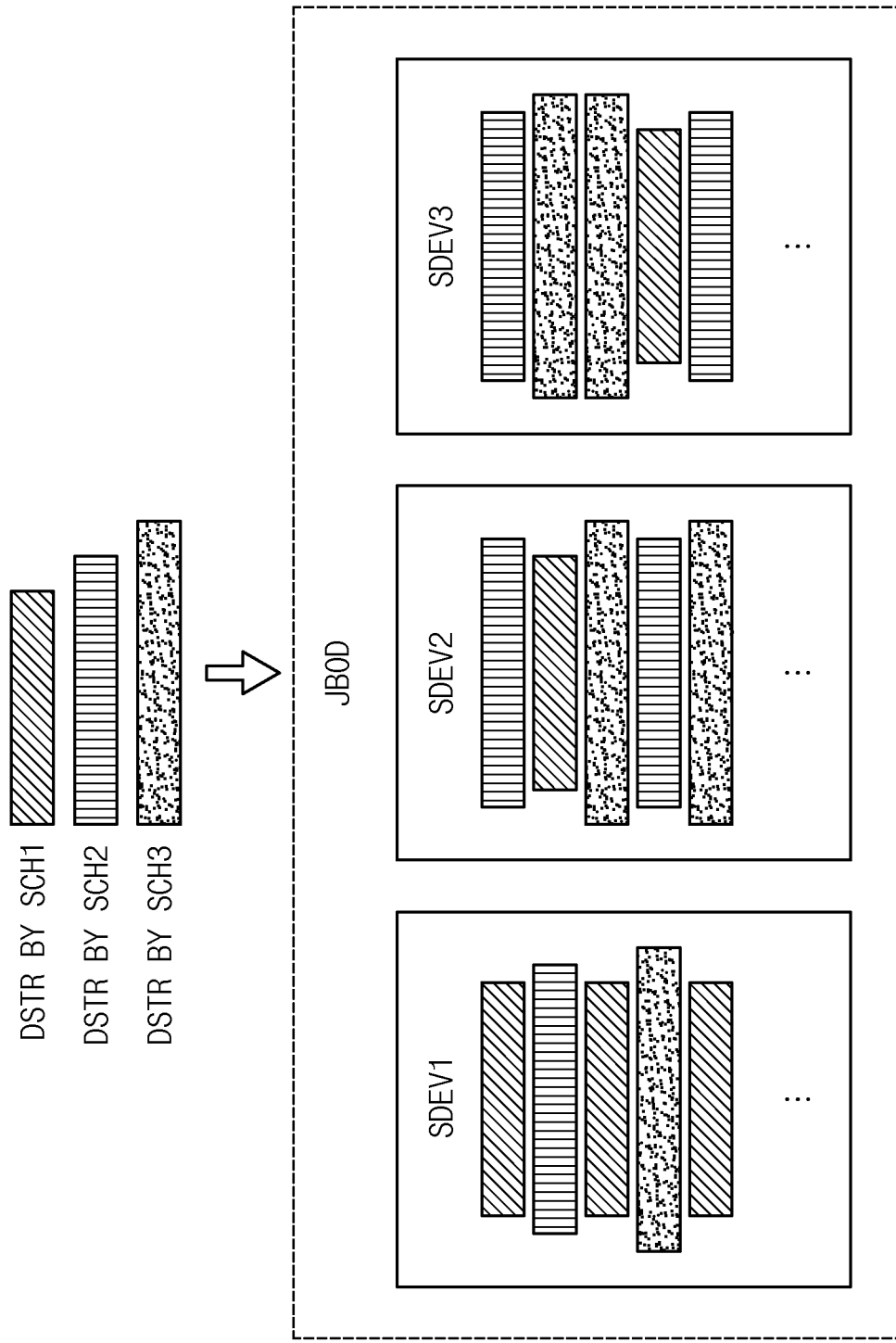
FIG. 23 is a diagram illustrating an example of storing data in a storage system according to one or more embodiments.

FIG. 23 is a diagram illustrating an example of storing data in a storage system according to one or more embodiments. Referring to FIG. 23, a fixed target erasure coding scheme may not set to each of the first storage device SDEV1, a second storage device SDEV2, and a third storage device SDEV3.

As described with reference to FIGS. 20 through 22, the target erasure coding scheme corresponding to the original data to be stored in the storage devices SDEV1 and SDEV2 may be determined and provided on the fly depending on the importance degree or the type of the original data. The first storage device SDEV1, the second erasure coding scheme SCH2 and the third storage device SDEV3 may form a JBOD (Just Bunch Of Disks).

In this case, as illustrated in FIG. 22, the data stripes DSTR encoded by the first erasure coding scheme SCH1, the second erasure coding scheme SCH2 and the third erasure coding scheme SCH3 may be commonly stored in each of the first storage device SDEV1, the first storage device SDEV2, and the third storage device SDEV3.

Figure 24:
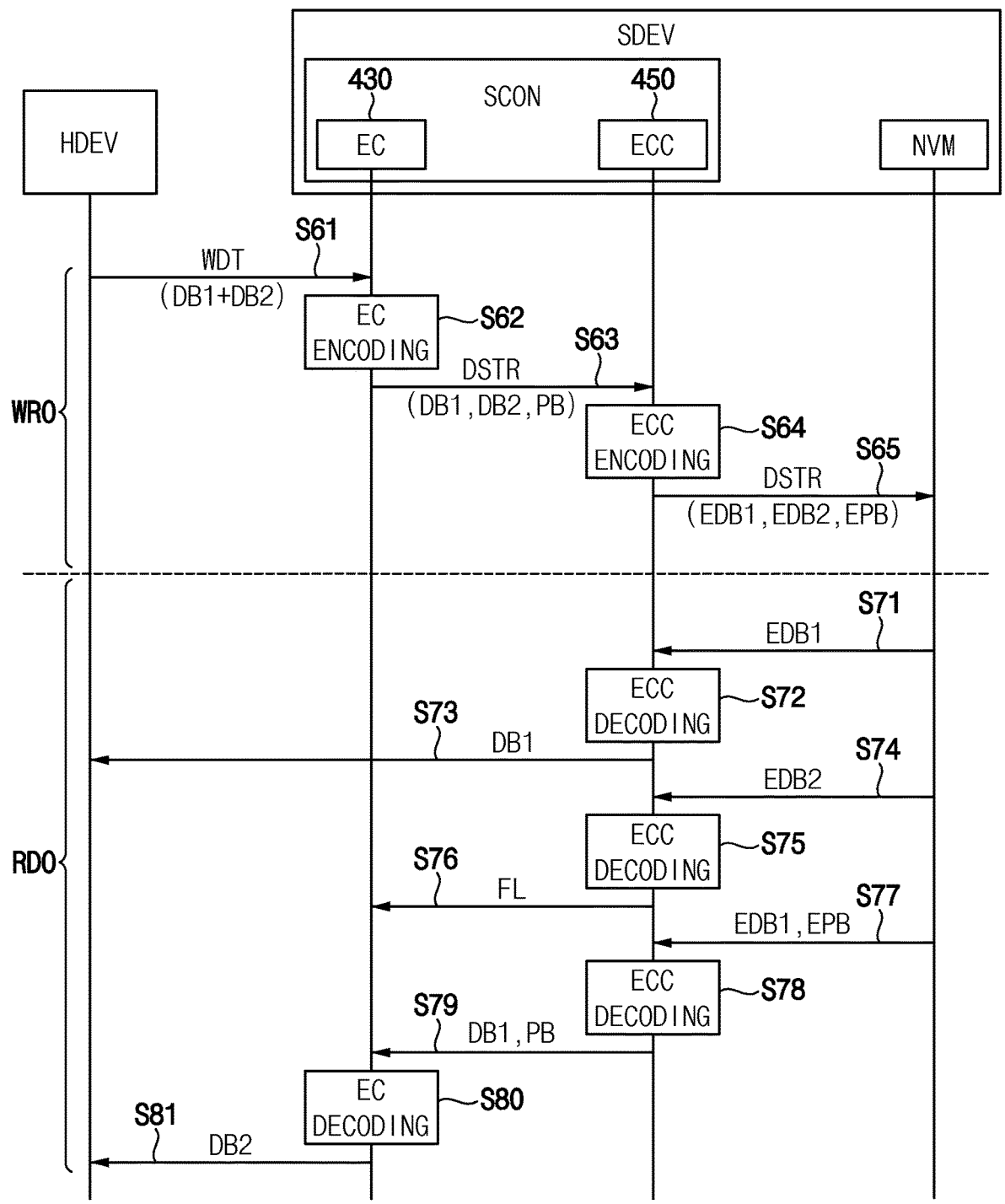
FIG. 24 is a diagram illustrating an example operation of a storage system according to one or more embodiments.

FIG. 24 is a diagram illustrating an example operation of a storage system according to one or more embodiments. FIG. 24 illustrates an example data flow between a host device HDEV and one storage device SDEV during a write operation WRO and a read operation RDO.

As described with reference to FIG. 6, the storage device SDEV may include a storage controller SCON and a nonvolatile memory device NVM and the storage controller SCON may include a local erasure coding controller EC 430 and an ECC engine 450.

Referring to FIG. 24, in the write operation WRO, the host device HDEV may transfer write data or original data WDT including a plurality of data blocks DB1 and DB2 to the storage device SDEV (S61). The erasure coding controller 430 may perform the erasure code encoding of the original data WDT (S62) to generate at least one parity block PB, and provide a data stripe DSTR including the plurality of data blocks DB1 and DB2 and the parity block PB to the ECC engine 450 (S63).

The ECC engine 450 may perform ECC encoding with respect to each of the plurality of data blocks DB1 and DB2 and the parity block PB (S64) to generate a data stripe EDSTR including a plurality of encoded data blocks EDB1 and EDB2 and at least on encoded parity block EPB. The storage device SDEV may store the plurality of encoded data blocks EDB1 and EDB2 and the encoded parity block EPB in the storage device SDEV in the nonvolatile memory device NVM (S65).

In the read operation RDO, the encoded data block EDB1 corresponding to a read address may be read out from the nonvolatile memory device NVM (S71), and the ECC engine 450 may perform the ECC decoding with respect to the encoded data block EDB1 (S72). When the ECC engine 450 succeeds in the ECC decoding, the storage device SDEV may transfer the original data DB1 to the host device HDEV (S73).

In the read operation RDO, the encoded data block EDB2 corresponding to a read address may be read out from the nonvolatile memory device NVM (S74), and the ECC engine 450 may perform the ECC decoding with respect to the encoded data block EDB2 (S75). When the ECC engine 450 fails in the ECC decoding, the decoding fail information FL is transferred to the erasure coding controller 430 (S76). The encoded data block EDB1 and the encoded parity block EPB of the data stripe EDSTR may be read out from the nonvolatile memory device NVM (S77), and the ECC engine 450 may perform the ECC decoding with respect to the encoded data block EDB1 and the encoded parity block EPB (S78) to generate the original data block DB1 and the original parity block PB. The original data block DB1 and the original parity block PB are provided to the erasure coding controller EC (S79) and the erasure coding controller EC may perform the erasure code decoding (S80) to restore the original data block DB2 corresponding to the read address. When the erasure coding controller EC succeeds in the erasure code decoding, the storage device SDEV may transfer the original data block DB2 to the host device HDEV (S81).

As such, when the ECC decoding with respect to one of the plurality of encoded data blocks is failed (or based on the ECC decoding with respect to one of the plurality of encoded data blocks, which is failed), the ECC decoding may be performed with respect to the encoded parity blocks and the other encoded data blocks that are read from the plurality of storage devices to generate the parity blocks and the other data blocks.

As described above, the storage system and the method of data recovery of the storage system according to one or more embodiments may efficiently restore data loss and enhance reliability of the storage system regardless of performance difference between the plurality of storage devices by determining the target erasure coding scheme corresponding to the original data based on the device characteristics of the plurality of storage devices or the data characteristics of the original data.

The one or more embodiments may be applied to a storage device and any system including the storage device. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, etc.

The foregoing is illustrative of one or more embodiments and is not to be construed as limiting thereof. Although a few one or more embodiments have been described, those skilled in the art will readily appreciate that many modifications are possible in the one or more embodiments without materially departing from the present inventive concept.

What is claimed is:

1. A method of data recovery of a storage system comprising a plurality of storage devices and a host device controlling the plurality of storage devices, the method comprising:
    setting a plurality of erasure coding schemes that are different from each other;
    determining a target erasure coding scheme among the plurality of erasure coding schemes, based on device characteristics of the plurality of storage devices, the target erasure coding scheme being corresponding to original data to be stored in the plurality of storage devices;
    dividing the original data into a plurality of data blocks corresponding to the target erasure coding scheme;
    generating parity blocks by encoding the plurality of data blocks, the parity blocks being corresponding to the target erasure coding scheme;
    storing a data stripe comprising the plurality of data blocks and the parity blocks in the plurality of storage devices; and
    based on a loss occurring in the plurality of data blocks stored in the plurality of storage devices, restoring the original data based on the parity blocks stored in the plurality of storage devices,
    wherein the device characteristics comprise a data bit number stored in a memory cell of a storage device or a degeneration degree of the storage device.

2. The method of claim 1, wherein the plurality of data blocks and the parity blocks in the data stripe are stored in a same storage device of the plurality of storage devices.

3. The method of claim 1, further comprising generating coding information by setting an erasure coding scheme corresponding to a storage device, based on the device characteristics of the plurality of storage devices.

4. The method of claim 3, further comprising determining a target storage device in which the original data is to be stored,
    wherein an erasure coding scheme corresponding to the target storage device is determined as the target erasure coding scheme, based on the coding information.

5. The method of claim 3, further comprising generating coding information by setting an erasure coding scheme corresponding to the storage device, based on the degeneration degree of the storage device.

6. The method of claim 5, wherein a data recovery performance of each erasure coding scheme increases as the degeneration degree of the storage device increases.

7. The method of claim 1, further comprising generating coding information by setting an erasure coding scheme corresponding to a storage device, based on the data bit number stored in the memory cell of the storage device.

8. The method of claim 7, wherein a data recovery performance of the erasure coding scheme increases as the data bit number stored in the memory cell of the storage device increases.

9. The method of claim 1, further comprising generating coding information based on data characteristics of a plurality of data,
    wherein an erasure coding scheme corresponding to the data characteristics of the original data is determined as the target erasure coding scheme, based on the coding information.

10. The method of claim 9, wherein an erasure coding scheme of a higher data recovery performance is set as the target erasure coding scheme based on the original data corresponding to system metadata associated with an operating system of the storage system, and
    wherein an erasure coding scheme of a lower data recovery performance is set as the target erasure coding scheme based on the original data corresponding to user data.

11. The method of claim 9, wherein an erasure coding scheme of a lower data recovery performance is set as the target erasure coding scheme based on the original data corresponding to hot data of a higher update frequency, and
    wherein an erasure coding scheme of a higher data recovery performance is set as the target erasure coding scheme based on the original data corresponding to cold data of a lower update frequency.

12. The method of claim 1, wherein, in a write operation, error check code (ECC) encoding is performed with respect to the plurality of data blocks and the parity blocks to generate a plurality of encoded data blocks and encoded parity blocks,
    wherein the plurality of encoded data blocks and the encoded parity blocks are stored in the plurality of storage devices, and
    wherein, in a read operation, ECC decoding is performed with respect to the plurality of encoded data blocks that are read from the plurality of storage devices to restore the plurality of data blocks.

13. The method of claim 12, wherein, based on the ECC decoding with respect to the plurality of encoded data blocks, which is failed, ECC decoding is performed with respect to the encoded parity blocks and the other encoded data blocks that are read from the plurality of storage devices to generate the parity blocks and the other data blocks.

14. The method of claim 1, wherein an erasure coding scheme comprises a number of the plurality of data blocks and a number of the parity blocks.

15. A storage system comprising:
an interconnector;
a plurality of storage devices connected to the interconnector and configured to store data;
a host device connected to the interconnector, the host device being configured to:
set a plurality of erasure coding schemes that are different from each other, and
determine a target erasure coding scheme corresponding to original data to be stored in the plurality of storage devices among the plurality of erasure coding schemes, based on device characteristics of the plurality of storage devices or data characteristics of the original data; and
at least one storage device of the plurality of storage devices, the at least one storage device being configured to:
divide the original data into a plurality of data blocks corresponding to the target erasure coding scheme,
generate parity blocks corresponding to the target erasure coding scheme, by encoding the plurality of data blocks,
wherein the device characteristics comprise a data bit number stored in a memory cell of a storage device or a degeneration degree of the storage device.

16. The storage system of claim 15, wherein the at least one storage device comprises a plurality of local erasure coding controllers respectively in the plurality of storage devices, and
wherein a respectively local erasure coding controller of the plurality of local erasure coding controllers is configured to perform an erasure coding with respect to a respective storage device of the plurality of storage devices.

17. The storage system of claim 15, wherein the at least one storage device comprises a global erasure coding controller in the interconnector, and
wherein the global erasure coding controller is configured to perform erasure coding with respect to the plurality of storage devices.

18. The storage system of claim 15, wherein the plurality of storage devices is configured to be connected to the host device as a just bunch of disks (JBOD).

19. A method of data recovery of a storage system having a plurality of storage devices and a host device controlling the plurality of storage devices, the method comprising:
generating coding information comprising a plurality of erasure coding schemes respectively corresponding to the plurality of storage devices;
determining a target storage device configured to store original data among the plurality of storage devices;
determining, based on the coding information, a target erasure coding scheme among the plurality of erasure coding schemes, the target erasure coding scheme being corresponding to the target storage device;
dividing the original data into a plurality of data blocks corresponding to the target erasure coding scheme;
generating parity blocks by encoding the plurality of data blocks, the parity blocks being corresponding to the target erasure coding scheme;
storing a data stripe comprising the plurality of data blocks and the parity blocks in the target storage device; and
based on a loss that occurs in the plurality of data blocks stored in the target storage device, restoring the original data based on the parity blocks stored in the target storage device,
wherein device characteristics of the plurality of storage devices comprise a data bit number stored in a memory cell of a storage device or a degeneration degree of the storage device.

20. The method of claim 19, wherein two erasure coding schemes of the plurality of erasure coding schemes are different.

* * * * *